(12) United States Patent
Hardy-McGee

(10) Patent No.: US 8,744,998 B2
(45) Date of Patent: Jun. 3, 2014

(54) FTP DEVICE AND METHOD FOR MERCHANT DATA PROCESSING

(75) Inventor: Linda R. Hardy-McGee, Newark, CA (US)

(73) Assignee: Visa USA, Inc., San Francisco, CA (US)

(*) Notice: Subject to any disclaimer, the term of this patent is extended or adjusted under 35 U.S.C. 154(b) by 405 days.

(21) Appl. No.: 12/548,180

(22) Filed: Aug. 26, 2009

(65) Prior Publication Data

US 2010/0058156 A1 Mar. 4, 2010

Related U.S. Application Data

(60) Provisional application No. 61/092,526, filed on Aug. 28, 2008.

(51) Int. Cl.
*G06F 7/00* (2006.01)
*G06F 17/30* (2006.01)

(52) U.S. Cl.
USPC .......................................................... 707/625

(58) Field of Classification Search
USPC ........................ 707/625, 692, 703; 705/30, 35
See application file for complete search history.

(56) References Cited

U.S. PATENT DOCUMENTS

| | | | |
|---|---|---|---|
| 6,081,789 A | 6/2000 | Purcell | |
| 6,490,567 B1 | 12/2002 | Gregory | |
| 6,731,932 B1 | 5/2004 | Rune et al. | |
| 6,944,677 B1 | 9/2005 | Zhao | |
| 6,993,502 B1 * | 1/2006 | Gryglewicz et al. | 705/31 |
| 7,103,165 B2 | 9/2006 | Baniak et al. | |
| 7,324,999 B2 | 1/2008 | Judd | |
| 7,334,184 B1 | 2/2008 | Simons | |
| 7,376,680 B1 * | 5/2008 | Kettler et al. | 1/1 |
| 7,606,730 B2 | 10/2009 | Antonucci | |
| 7,962,405 B2 * | 6/2011 | Sgaraglio et al. | 705/39 |
| 8,036,963 B2 * | 10/2011 | Carroll et al. | 705/35 |
| 8,156,074 B1 * | 4/2012 | Multer et al. | 707/610 |
| 2002/0111842 A1 | 8/2002 | Miles | |
| 2002/0128977 A1 | 9/2002 | Nambiar et al. | |
| 2004/0054625 A1 | 3/2004 | Kellogg et al. | |

(Continued)

FOREIGN PATENT DOCUMENTS

| | | |
|---|---|---|
| JP | 2001-306876 A | 11/2001 |
| KR | 2006-0012105 A | 2/2006 |
| KR | 2006-0130469 A | 12/2006 |

OTHER PUBLICATIONS

International Search Report dated Apr. 20, 2010 for PCT/US2009/055251, 2 pages.

(Continued)

*Primary Examiner* — Jeffrey A Burke
(74) *Attorney, Agent, or Firm* — Loeb & Loeb LLP

(57) ABSTRACT

A method begins by receiving at least a portion of a merchant master file. The method continues, for a merchant data file, by determining whether a corresponding merchant profile record exists within a merchant profile database. The method continues, when the corresponding merchant profile record exists in the merchant profile database, by comparing the merchant data file with the corresponding merchant profile record. The method continues, when an inconsistency exists between the corresponding merchant profile record and the merchant data file, by determining status of the merchant data file with respect to the at least a portion of the merchant master file. The method continues, when the status of the merchant data file is a first status level, by generating an inconsistency message that identifies the inconsistency.

27 Claims, 27 Drawing Sheets

(56) References Cited

U.S. PATENT DOCUMENTS

| | | |
|---|---|---|
| 2004/0172360 A1 | 9/2004 | Mabrey et al. |
| 2004/0215543 A1* | 10/2004 | Betz et al. ................... 705/35 |
| 2004/0230536 A1 | 11/2004 | Fung et al. |
| 2005/0022006 A1 | 1/2005 | Bass et al. |
| 2005/0027543 A1 | 2/2005 | Labrou et al. |
| 2005/0027648 A1 | 2/2005 | Knowles et al. |
| 2005/0033675 A1 | 2/2005 | Nakashima et al. |
| 2006/0212407 A1 | 9/2006 | Lyon |
| 2006/0224514 A1 | 10/2006 | Buschi et al. |
| 2006/0277113 A1 | 12/2006 | Richards |
| 2007/0203732 A1 | 8/2007 | Griegel et al. |
| 2007/0250920 A1 | 10/2007 | Lindsay |
| 2008/0015954 A1 | 1/2008 | Huber |
| 2008/0065396 A1 | 3/2008 | Marshall |
| 2008/0147552 A1 | 6/2008 | Morsillo et al. |
| 2008/0167956 A1* | 7/2008 | Keithley ................... 705/14 |
| 2008/0177797 A1 | 7/2008 | Eldering et al. |
| 2009/0292642 A1* | 11/2009 | Han ................... 705/71 |
| 2009/0327133 A1* | 12/2009 | Aharoni et al. ................... 705/44 |
| 2010/0010889 A1 | 1/2010 | Antonucci |
| 2010/0049620 A1 | 2/2010 | Debow |
| 2010/0161484 A1 | 6/2010 | Leggatt et al. |

OTHER PUBLICATIONS

International Search Report dated Apr. 12, 2010 for PCT/US2009/055254, 2 pages.
International Search Report dated Mar. 29, 2010 for PCT/US2009/055257, 2 pages.
International Search Report dated Apr. 12, 2010 for PCT/US2009/055259, 2 pages.
QPCA for Merchants, Visa, Sep. 7, 2007, 9 pages.
IRS Bulletin, "Qualified Payment Card Agent Determination," Aug. 2, 2004, 3 pages.
Visa, "QPCA for Merchants," Sep. 7, 2007, 9 pages.

* cited by examiner

Update MI 185

"RS"

MERCH INFO
DBA:
FRAN or CHN:
NAME:
CORP STAT:
TAX ID:

MAIL INFO
ADDR: ← field 186
CITY:
ST:
ZIP:
PH #:

LOC INFO
ADDR:
CITY:
ST:
ZIP:
PH #:

CORP INFO
NAME:
ADDR:
CITY:
ST:
ZIP:
ETC.

Opt in/out
Status
(change)

[back] [submit]

Update QPCA 188

Set Opt in/out Status
QPCA Status    Opt-In [X]    Opt-Out [ ]

[back]                            [submit]

Confirm MI 190

"RS"

MERCH INFO
DBA:
FRAN or CHN:
NAME:
CORP STAT:
TAX ID:

MAIL INFO
ADDR:
CITY:
ST:
ZIP:
PH #:

LOC INFO
ADDR:
CITY:
ST:
ZIP:
PH #:

CORP INFO
NAME:
ADDR:
CITY:
ST:
ZIP:
ETC.

Opt in/out
Status

CERT
NM:
TTL:
CNTCT INFO:

submit back

Update Request MI 192

This record is: "Pending Approval"

PREV UPDATES
1:
2:
3:

MERCH INFO
DBA:
FRAN or CHN:
NAME:
CORP STAT:
TAX ID:

MAIL INFO

CORP INFO

LOC INFO
ADDR:
CITY:
ST:
ZIP:
PH #:

Opt in/out
Status finish
withdraw

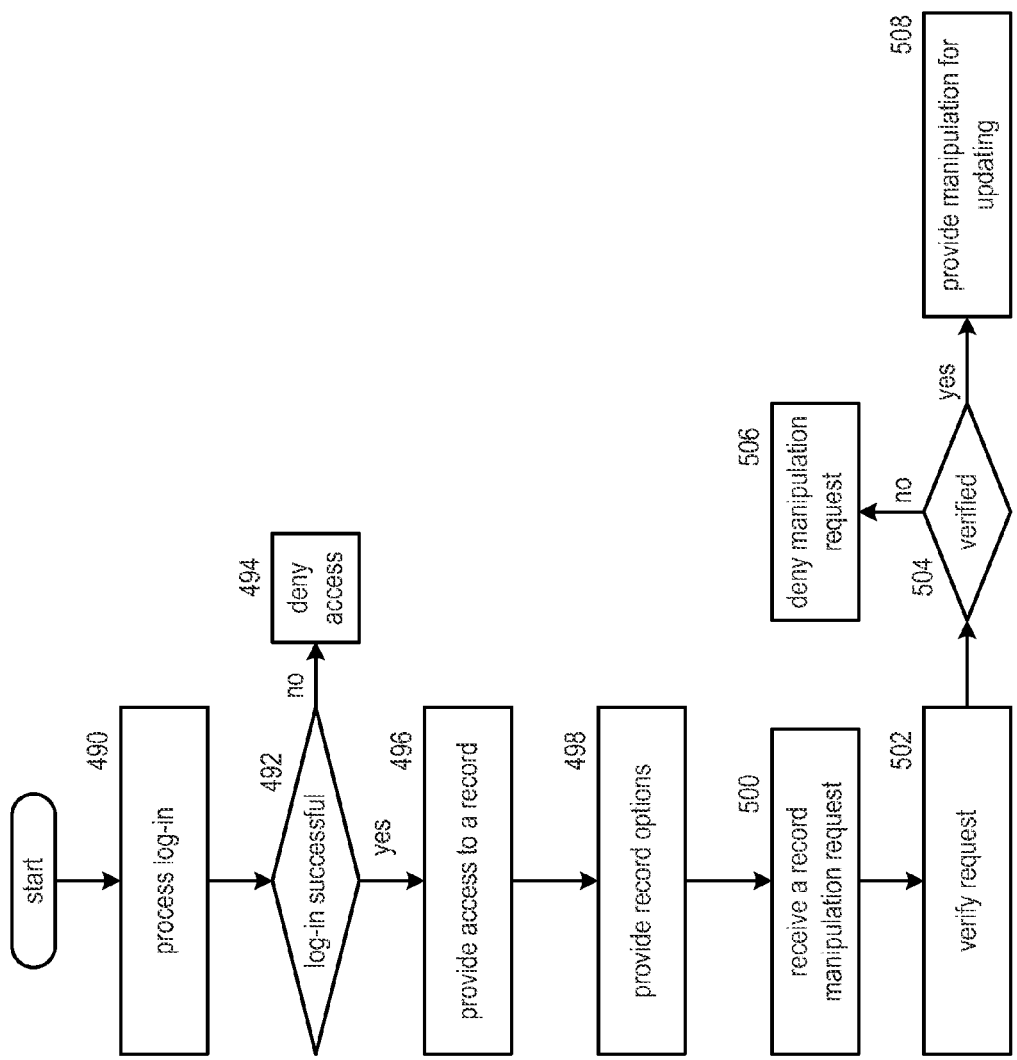

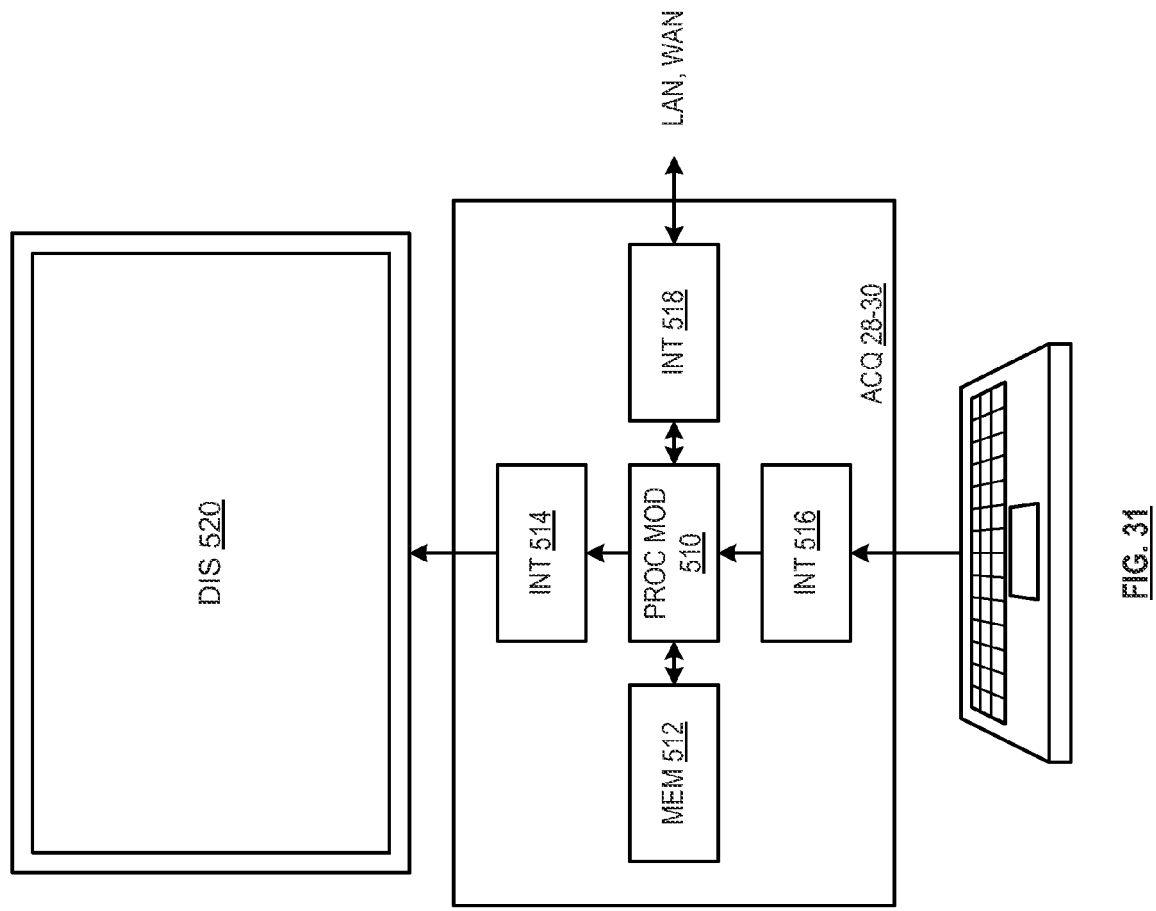

US 8,744,998 B2

FTP DEVICE AND METHOD FOR MERCHANT DATA PROCESSING

CROSS-REFERENCE TO RELATED APPLICATIONS

The present U.S. Utility patent application claims priority pursuant to 35 U.S.C. §119(e) to U.S. Provisional Patent Application Ser. No. 61/092,526, entitled "FTP Device and Method for Merchant Data Processing", filed Aug. 28, 2008, which is hereby incorporated herein by reference in its entirety and made part of the present U.S. Utility patent application for all purposes.

This patent application shares a common specification and figures with the following co-pending patent applications:
1. U.S. Utility patent application entitled "Acquirer Device and Method for Support of Merchant Data Processing", having a Ser. No. 12/547,887, and a filing date the same as the present patent application;
2. U.S. Utility patent application entitled "MRW Interface and Method for Support of Merchant Data Processing", having a Ser. No. 12/547,981, and a filing date the same as the present patent application; and
3. U.S. Utility patent application entitled "Merchant Device and Method for Support of Merchant Data Processing", having a Ser. No. 12/548,134, and a filing date the same as the present patent application.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

The present invention relates generally to financial transactions systems and more particularly to processing data within such financial transactions systems.

2. Description of Related Art

Millions of credit card transactions are accurately processed every day regardless of whether the purchaser is making a purchase in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) reads a purchaser's credit card information and obtains a transaction amount. The terminal transmits the credit card information and the transaction amount to an acquirer bank, which combines the credit card information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

The authorization and clearing & settlement process works essentially the same way for commercial credit card transactions as it does for personal credit card transactions. Commercial credit card transactions, however, have additional factors to consider. For instance, current U.S. tax laws require businesses, government agencies, and tax-exempt entities to report payments via a 1099-MISC form made to "service" merchants when annual aggregate payments exceed $600 per calendar year. If the company does not have the merchant's TIN at the time of payment, the company is required to backup withhold a portion of the payment. The matter is further complicated by inaccurate, incomplete, and/or inconsistent merchant data with respect to the merchant's taxable business identity. If the inaccurate, incomplete, and/or inconsistent merchant data is used to report the payments to a particular merchant, the reporting company may be subject to penalties for not accurately reporting the payments to the merchant. As a result, companies using commercial credit cards find it difficult to meet these requirements and many limit commercial credit card purchasing to merchandise-only transactions, effectively eliminating a significant potential market share.

To help with this issue, the Internal Revenue Service (IRS) has initiated a Qualified Payment Card Agent (QPCA) program that enables a payment card organization to collect, validate, maintain, and distribute merchant data needed for IRS Form 1099-MISC reporting. Currently, merchant data is provided to a payment card organization (e.g., Visa, Inc.) from the acquirer banks of the commercial credit card holders. The acquirer banks have no obligation to verify the accuracy of merchant data collected on behalf of its commercial credit card holders. As such, the merchant data in the payment card organization's database includes inaccuracies, incomplete records, and/or inconsistent data.

Therefore, a need exists for a system and method for obtaining merchant data and verifying the accuracy of the merchant data stored by a payment card organization.

BRIEF DESCRIPTION OF THE SEVERAL VIEWS OF THE DRAWING(S)

FIG. 8 is a diagram of an example of an updated merchant information page in accordance with the present invention;

FIG. 9 is a diagram of an example of an update QPCA page in accordance with the present invention;

FIG. 10 is a diagram of an example of a confirm merchant information page in accordance with the present invention;

FIG. 11 is a diagram of an example of an update request merchant information page in accordance with the present invention;

FIG. 30 is a logic diagram of another embodiment of a method for a merchant registration web page interface to facilitate the processing of a merchant data file in accordance with the present invention;

FIG. 31 is a schematic block diagram of an embodiment of an acquirer device in accordance with the present invention;

DETAILED DESCRIPTION OF THE INVENTION

Figure 1:
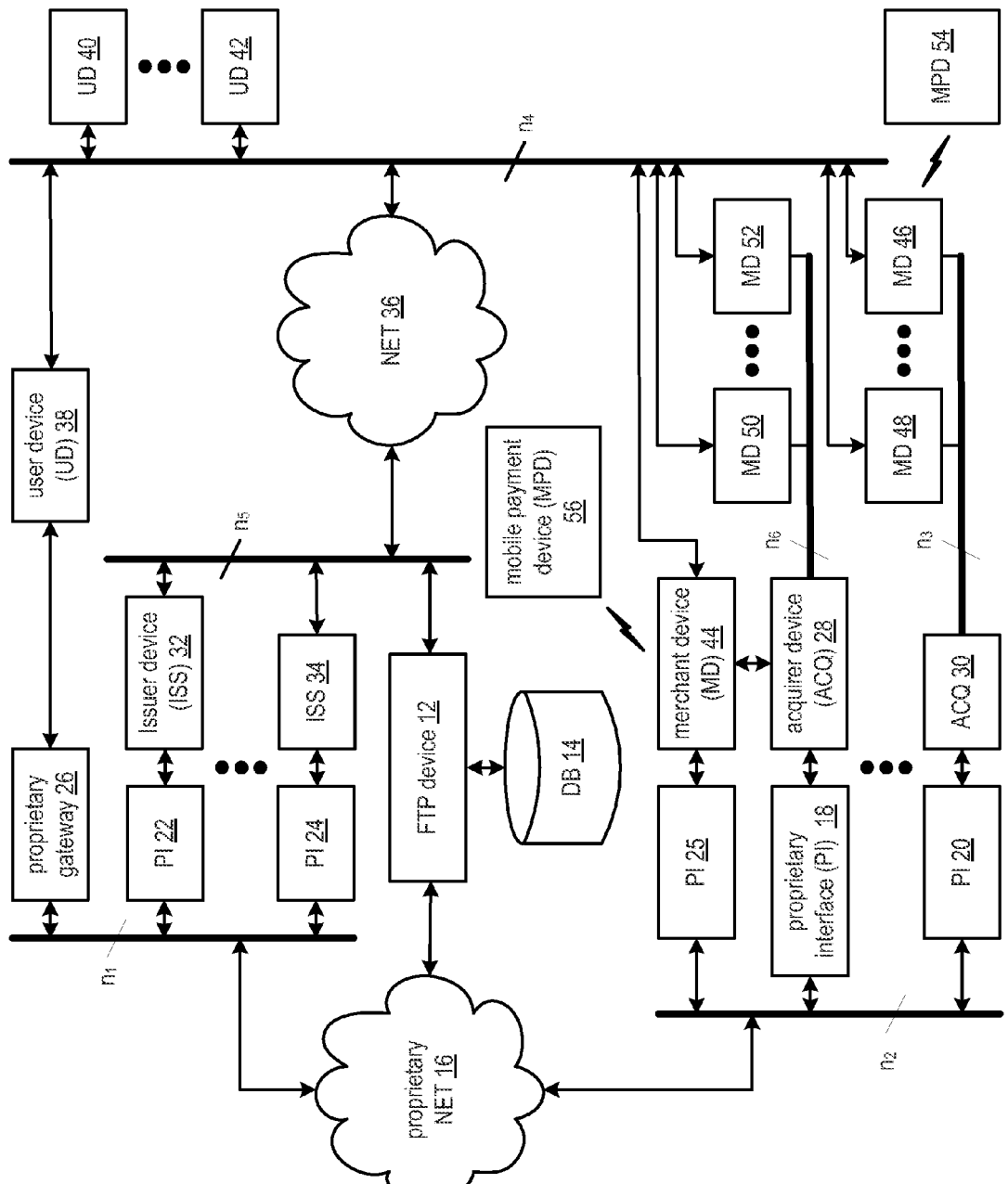
FIG. 1 is a schematic block diagram of an embodiment of a financial transaction network in accordance with the present invention.

FIG. 1 is a schematic block diagram of an embodiment of a financial transaction system 10 that includes a payment entity device 12, a database 14, a proprietary network 16, a plurality of proprietary interfaces 18-25, a proprietary gateway 26, a plurality of acquirer devices 28-30, a plurality of issuer devices 32-34, a public network 36 (e.g., the internet), a plurality of user devices 38-42, a plurality of merchant devices 44-52, and a plurality of mobile payment devices 54-56. The system 10 supports point of sale financial transactions, automatic payment financial transactions, mobile payment device financial transactions, user device public network based financial transactions, and/or any other type of credit account (e.g., credit card, pre-paid card, corporate card, debit card, purchasing card, mobile payment account, etc.) based financial transactions. The system 10 may also support credit account communications (e.g., account balance inquires, usage offers, bonus programs, general credit account information, etc.) via the public network 36. The system 10 may further support proprietary client services (e.g., commercial accounts payable and/or accounts receivable processing, financial reporting, etc.) for a client via its associated user device 38 and the proprietary gateway 26. Note that each of connection lines $n_1$-$n_6$ includes a plurality of individual connection lines for each device connected thereto, but are shown as a bundle for ease of illustration.

As shown, each of the issuer devices 32-34 and acquirer devices 28-30 is connected to the public network 36 and to the proprietary network 16 via a proprietary interface 18-25 to support one or more of the various financial transactions and credit account communications. For instance, a financial transaction may begin with a merchant device 44-52 (e.g., a computer, server, point of sale device, web browser application, and/or any device that facilitates a credit account based transaction) obtaining credit account information for a point of sale transaction, an internet transaction, a mobile payment transaction, etc. In addition, the merchant device 44-52 determines a corresponding transaction amount and transmits, via a connection line, the credit account information and the transaction amount to an affiliated acquirer device 28-30.

The acquirer device 28-30 (e.g., a computer, server, etc. that is associated with a financial institution supporting credit account transactions of a merchant) generates an authorization request from the credit account information and the transaction amount. In addition, for commercial transactions, the acquirer device 28-30 may also collect information regarding the merchant. The acquirer device 28-30 transmits the authorization request to the payment entity device 12 via the corresponding proprietary interface 18-20 and the proprietary network 16. The payment entity device 12 accesses the associated database 14 to identify the user associated with the credit account information, an issuer, etc. Having identified the issuer, the payment entity device 12 transmits the authorization request to the appropriate issuer device 32-34 via the proprietary network 16 and the corresponding proprietary interface 22-24.

In an embodiment, the payment entity device 12, the database 14, and the proprietary network 16 may be operated and maintained by a single entity to facilitate seamless authorization and clearing & settlement. For example, Visa, Inc. may provide its VisaNet® as the proprietary network 16 and have one or more computing devices (e.g., computers, servers, super computers, main frames, etc.) coupled to the proprietary network 16 to function as the payment entity device 12, and may have one or more databases 14 coupled thereto. Further, the proprietary interfaces 18-25, which may be proprietary nodes, modems, bridges, etc., serve as secure connection points to the proprietary network 16 to ensure that only authorized devices (e.g., merchant device 44, issuer device 32-34, acquirer device 28-30) have access to the proprietary network 16.

The issuer device 32-34 (e.g., a computer, server, etc. and corresponding financial transaction software associated with a financial institution that issues credit accounts to users) processes the authorization request to determine whether to approve or deny the request. The issuer device 32-34 transmits, via the associated proprietary interface 22-24 and the proprietary network 16, an approval or denial response to the payment entity device 12. The payment entity device 12 forwards the response to the acquirer device 28-30 via the proprietary network 16 and the corresponding proprietary interface 18-20. The acquirer device 28-30 forwards the response to the merchant device 44-52 via the corresponding connection line. Note that the system 10 also supports the clearing & settlement process.

The issuer devices 32-34, the acquirer devices 28-30, and/or the payment entity device 12 support credit account communications from users via the user devices 38-42 and the public network 36, from merchants via the merchant devices 44-52 and the public network 36, etc. For example, a user device 38-42 may access a web site running on the payment entity device 12 (e.g., Visa, Inc.'s web site) to obtain information regarding various credit card offers supported by Visa, Inc. As another example, a user device 38-42 may access an issuer device 32-34 via the public network 36 to obtain current information regarding the user's account with the issuer, on-line bill payment, open a new account, etc.

In addition to accessing the payment entity device 12 via the public network 36, a user device 38 (e.g., an individual's computer, a company computer, a company server, etc.) may have access to a proprietary gateway 26 to access the payment entity device 12 via the proprietary network 16 for a proprietary service (e.g., accounts payable, accounts receivable, financial reporting, elite class offers, etc.). Note that the proprietary gateway 26 may be a proprietary node, modem, bridge, etc., that serves as a public connection point to the proprietary network 16. The proprietary gateway 26 functions to ensure that only authorized entities (e.g., user device 38) have access to the proprietary network 16.

Figure 2:
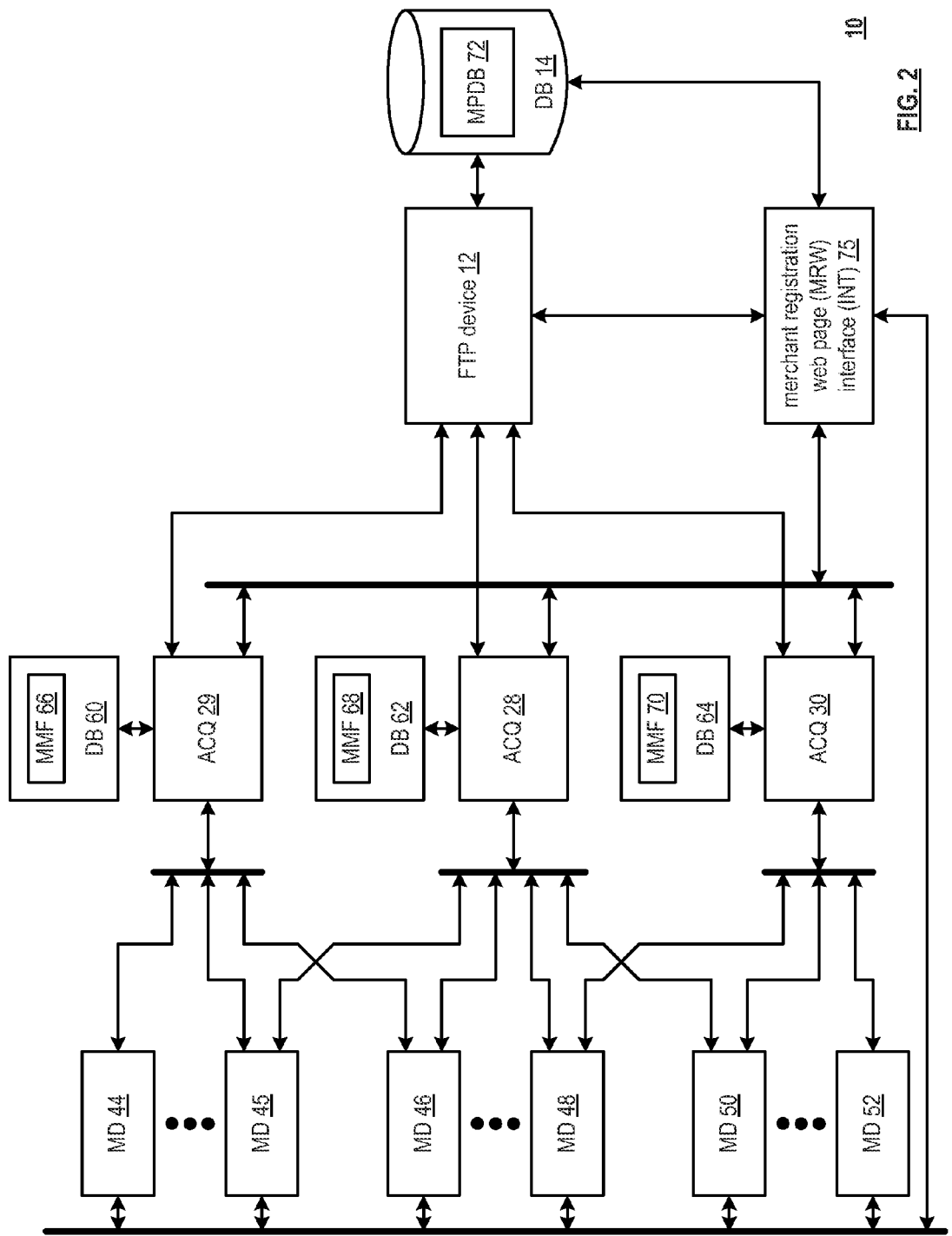
FIG. 2 is a schematic block diagram of another embodiment of a financial transaction network in accordance with the present invention.

FIG. 2 is a schematic block diagram of another embodiment of a financial transaction network that includes a plurality of merchant devices 44-52, a plurality of acquirer devices 28-30, the financial transactions processing device 12, the database 14, a plurality of acquirer databases 60-64, and a merchant registration web-page interface 75. Each of the acquirer databases 60-64 stores an acquirer's merchant master file (MMF) 66-70 and the database 14 stores a merchant profile database (MPDB) 72.

The merchant registration web-page (MRW) interface 75 provides an interface (e.g., a specific function of interface 25) to the financial transaction processing device 12 and/or the database 14 such that merchants, via their merchant devices 44-52, can verify their corresponding merchant profile records within the merchant profile database 72. In addition, if there is an inconsistency (e.g., incorrect business name, incorrect address, incorrect business type, a misspelling, etc.) the merchant, via its device, may correct the inconsistency, subject to approval by its acquirer, via its acquirer device 28-30. In this manner, accurate merchant data is stored and maintained within the merchant profile database 72, which can be used as part of a Qualified Payment Card Agent (QPCA) program to facilitate accurate IRS Form 1099-MISC merchant reporting.

The financial transactions processing device 12 initially populates the merchant profile database 14 from the master merchant files (MMF) 66-70 it receives from the acquirer devices 28-30. For a merchant that is included in multiple MMFs 66-70, the financial transactions processing device 12 merges the separate merchant data files into one merchant profile record. In addition, the financial transactions processing device 12 may supplement a merchant profile record with third party data. For example, the financial transactions processing device 12 may verify and/or obtain: a tax identification number of the merchant via the IRS; address information of the merchant via a CASS (Coding Accuracy Support System); business information (e.g., business type, various trade names, credit data, etc.) from third party vendors; etc.

After the merchant profile database 72 is initially populated, the financial transactions processing device 12 may receive delta merchant master files (e.g., new merchant data files, updates to merchant data files, etc.) and update the merchant profile database 72 in accordance with the delta merchant master files. An acquirer device 28-30 may transmit its delta merchant master file periodically (e.g., once per week, once per day, etc.) or at the prompting of the financial transaction processing device 12.

For a merchant, via its merchant device 44-52, to view its merchant profile record via the MRW interface 75, it must be a registered and active user. For a merchant to become a registered user, a secure registration process is employed. For example, the merchant may receive a registration package in the mail from the operator of the financial transactions processing device 12. The registration package may include a unique merchant ID code, the data contained in the merchant's profile record, its associated acquirer(s), instructions on how to register, and any other relevant information. Using the unique merchant ID code, the merchant, via its device 44-52, accesses the MRW interface 75 and follows the instructions for registration. Once registered, the merchant, via its device 44-52, may opt-in or opt-out of a QPCA (Qualified Payment Card Agent) program offered by the operator of the financial transactions processing device 12. If the merchant opts-in, it is an active user, and if it opts-out, it is an inactive user. The MRW interface 75 allows a merchant, via its device, to change its active status at any time after registration and may allow the merchant to change its status as often as the merchant desires.

Once a merchant is registered, it can view, via its device, the data in its merchant profile record. In this instance, the MRW interface 75 retrieves the data from the database 14 and/or via the financial transactions processing device 12 and presents the data in one or more web pages. Examples of the web pages are provided in FIGS. 6-11. The merchant, via its device 44-52, may certify the accuracy of the data, review the data, and/or make a change to the data. If a change is made, the MRW interface 75 and/or the financial transactions processing device 12 processes the change and provides a notice to the acquirer device associated with the merchant for approval of the change. Upon approval, the change is recorded in the merchant profile database 14.

As an alternative to accessing the MRW interface 75 directly, a merchant device 44-52 may access the MRW interface 75 and/or the financial transactions processing device 12 via its associated acquirer device 28-30. In this instance, a merchant device 44-52 logs onto its associated acquirer's device 28-30, which functions as conduit between the merchant device 44-52 and the MRW interface 75 and/or the financial transactions processing device 12. Further details and functions of the system 10 will be described in greater detail with reference to FIGS. 3-35.

Figure 3:
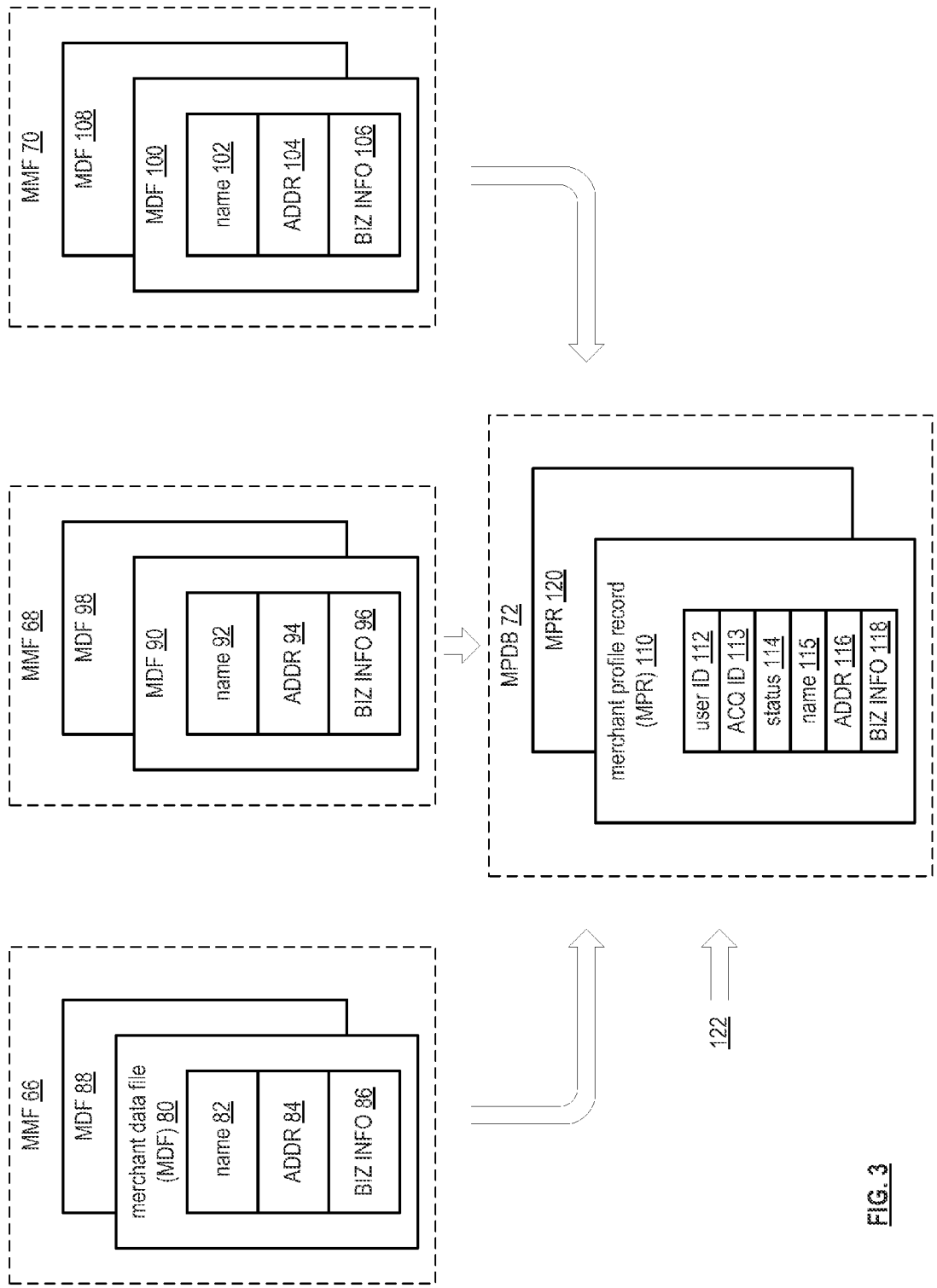
FIG. 3 is a diagram of an example of processing a merchant profile database in accordance with the present invention.

FIG. 3 is a diagram of an example of a merchant profile database 72 and a plurality of merchant master files 66-70. Each of the merchant master files 66-70 includes a plurality of merchant data files 80, 88; 90, 98; & 100, 108. A merchant data file (e.g., 80, 90, 100) includes merchant name information (e.g., 82, 92, 102), merchant address information (e.g., 84, 94, 104), merchant business information (e.g., 86, 96, 106), and may further include other information regarding the merchant. In addition, each of the merchant master files 66-70 may be an initial merchant master file or a delta merchant master file.

The merchant profile database (MPDB) 72 includes a plurality of merchant profile records 110, 120. Each of the merchant profile records 110, 120 includes a user ID field 112 (e.g., the unique ID code assigned to the merchant), an acquirer ID field or fields 113 (which identifies the associated acquirer or acquirers), a status field or fields 114 (e.g., stores the status of the record and/or opt-in/opt-out status), a merchant name field or fields 115, a merchant address field or fields 116, and/or merchant business information field or fields 118.

The financial transactions processing (FTP) device 12 and/or the MRW interface 75 processes the merchant master files (MMF) 66-70 with respect to the merchant profile database 72. For example, the FTP device 12 and/or the MRW interface 75 may create a merchant profile record 110, 120 for a new merchant identified in one of the MMFs 66-70. As another example, the FTP device 12 and/or the MRW interface 75 may update a merchant profile record 110, 120 based on an updated merchant data file 80, 88, 90, 98, 100, 108 in one of the MMFs 66-70. As yet another example, the FTP device 12 and/or the MRW interface 75 may identify a merchant that has a merchant profile record 110, 120 but does not have a corresponding merchant data file in one of the MMFs 66-70.

The FTP device 12 and/or the MRW interface 75 may supplement the data of a merchant profile record 110, 120 with data from other sources 122. For example, the data may be supplemented with a tax identification number of the merchant from the IRS; address information of the merchant from CASS (Coding Accuracy Support System); business information (e.g., business type, various trade names, credit data, etc.) from third party vendors; etc.

Figure 4:
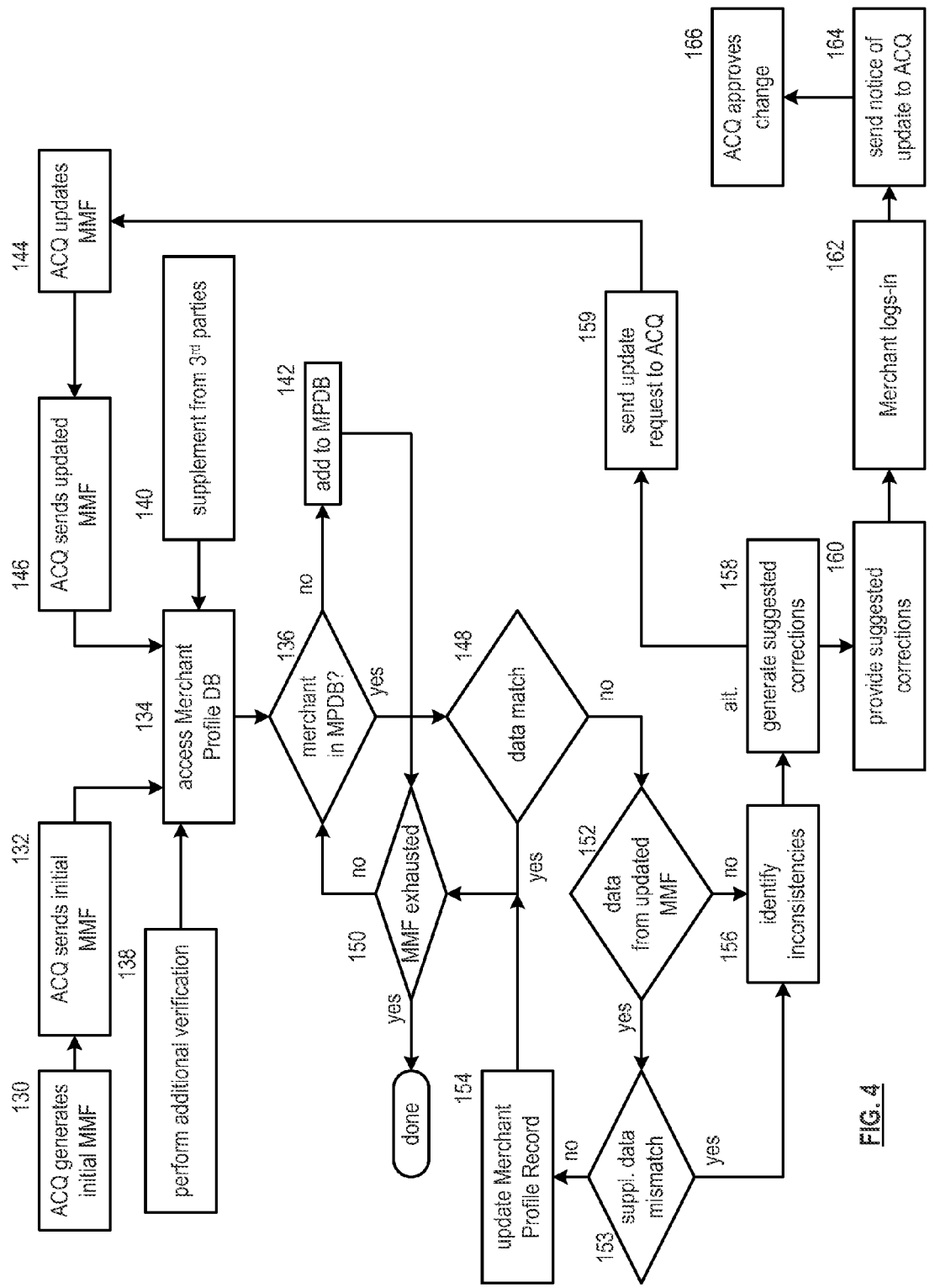
FIG. 4 is a logic diagram of an embodiment of a method for processing a merchant profile database in accordance with the present invention.

FIG. 4 is a logic diagram of an embodiment of a method for processing a merchant profile database that begins at step 130 where an acquirer device 28-30 generates an initial merchant master file (MMF). The initial MMF includes a plurality of merchant data files such as the ones 80, 88, 90, 98, 100, 108 discussed with reference to FIG. 3. For a given acquirer, the number of merchant data files in the initial MMF will approximately correspond to the number of merchants it services in an acquirer capacity. The method proceeds to step 132 where an acquirer device sends the initial MMF to the financial transactions processing device 12 and/or the MRW interface 75.

The method continues at step 134 where the financial transactions processing (FTP) device 12 and/or the MRW interface 75 access the merchant profile database 14 based on identity of the acquirer (e.g., ACQ ID). In this step, the FTP device 12 and/or the MRW interface 75 retrieves a plurality of merchant profile records that includes the acquirer ID to produce a plurality of retrieve merchant profile records. Alternatively, the FTP device 12 and/or the MRW interface 75 may access the merchant profile database a record at a time for each of the merchant data files in the initial MMF.

The method continues at step 136 where the FTP device 12 and/or the MRW interface 75 determine whether, for a merchant data file of the MMF, a corresponding merchant profile record exists in the merchant profile database (MPDB). If not, the method proceeds to step 142 where a new record is created for the merchant based on the merchant data file. Upon creating the new merchant profile record, the FTP device 12 and/or the MRW interface 75 may send a message to the acquirer device 28-30 indicating that a new merchant profile record was created for a particular merchant. The method continues at step 150 where the FTP device 12 and/or the MRW interface 75 determines whether all or a designated number of the merchant data files of the MMF have been processed. If yes, the method is complete for this acquirer's MMF. If not, the process repeats at step 136 for another merchant data file of the MMF.

If the merchant data file has a corresponding merchant profile record in the MPDB as determined at step 136, the method proceeds to step 148 where the FTP device 12 and/or the MRW interface 75 determine whether the data of the merchant profile record of the MPDB matches the data of the merchant data file of the MMF. If yes, the method proceeds to step 150. If, however, the data of the merchant data file does not match the data of the merchant profile record, the method continues at step 152 where the FTP device 12 and/or the MRW interface 75 determines whether the data of the merchant data file is from an updated MMF.

If the merchant data file is from an updated MMF, the method continues at step 153 where the FTP device 12 and/or the MRW interface 75 determines whether the data mismatch is the result of supplemental data added to the merchant profile record. Note that, at steps 138 and 140, the FTP device 12 and/or the MRW interface 75 may supplement the data of a merchant profile record with data from third parties, with tax identification information from the IRS, and/or physical address information using CASS or some other system. If the data mismatch is not regarding supplemental data, the method continues at step 154 where the FTP device 12 and/or the MRW interface 75 updates the merchant profile record in accordance with the data of the merchant data file.

If, at step 152, the merchant data file is not from an updated MMF (i.e., it is from the initial MMF) or if, at step 153, the data mismatch is a regarding supplemental data, the method continues at step 156. At this step, the FTP device 12 and/or the MRW interface 75 determines the inconsistencies between the merchant data file and the merchant profile record. Such inconsistencies may be missing data in the merchant data file and/or in the merchant profile record, different data for the corresponding field or fields (e.g., business name, business address, business information), etc.

The method then continues at step 158 where the FTP device 12 and/or the MRW interface 75 generates a suggested correction of the inconsistency. The suggested correction may be based on the supplemental data obtained from third parties, suggesting the use of the more current data of the merchant data file or the merchant profile record, highlighting the inconsistent data, etc. In one embodiment, the method proceeds to step 159, where the FTP device 12 and/or the MRW interface 75 sends an update request to the acquirer device, wherein the request may include the suggested correction. In another embodiment, the method proceeds to step 160 where the suggested corrections are provided to a merchant device (i.e., the device affiliated with the merchant identified in the merchant profile record currently being processed) or to the acquirer device, which informs the merchant of the inconsistency and suggested correction.

The method then continues at step 162 where a merchant device logs-in with the MRW interface 75 to update the data in its merchant profile record. The FTP device 12 and/or the MRW interface 75 record the merchant's changes and flag them as pending approval. The method proceeds to step 164 where the FTP device 12 and/or the MRW interface 75 provides a notice the acquirer device requesting that the merchant's data changes be approved. The method proceeds to step 166 where the acquirer device provides approval of the merchant's data changes.

The acquirer device may periodically, in response to a request, and/or randomly generate an updated merchant master file (MMF) as shown in step 144. In this step, the acquirer device accumulates changes to the merchant master file with respect to the last MMF or update thereof provided to the FTP device 12 and/or the MRW interface 75. As such, the updated MMF, or delta MMF, includes new merchants' data files, changes to merchant data files determined by the acquirer, changes provided to the acquirer by the merchant, etc. The method proceeds to step 146 where the acquirer device sends the updated MMF to the FTP device 12 and/or the MRW interface 75. The process repeats at step 134 for the merchant data files of the updated MMF.

The logic diagram of FIG. 4 is repeated for each MMF received from each of a plurality of acquirers. The FTP device 12 and/or the MRW interface 75 may serially perform the method of FIG. 4 for the plurality of acquirers, may perform the method in parallel for the plurality of acquirers, or a combination thereof.

While not shown in Figure, a situation may arise where the merchant profile database includes a merchant profile record having an acquirer ID, but a corresponding merchant data file is not in the MMF of the acquirer. In this instance, the FTP device 12 and/or the MRW interface 75 provides a notice of the inconsistency, requesting the acquirer to resolve the inconsistency.

Figure 5:
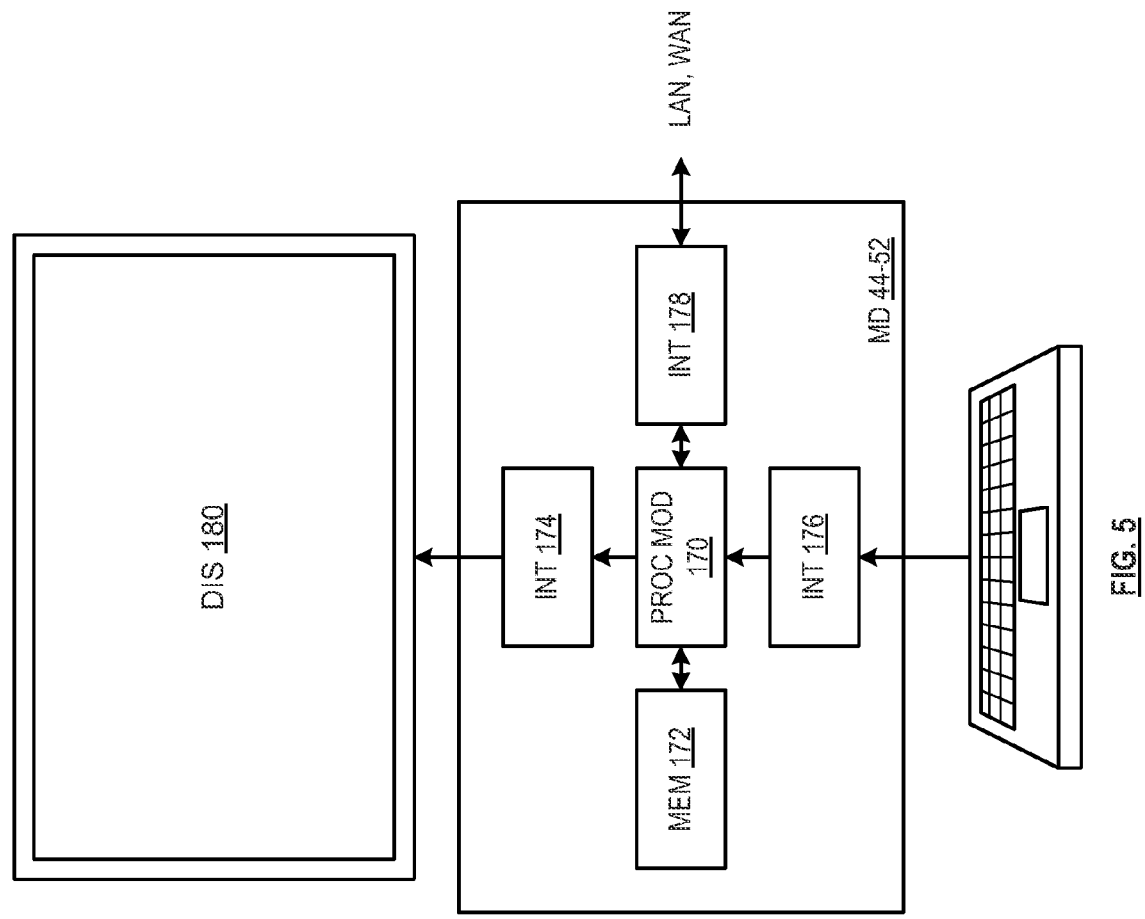
FIG. 5 is a schematic block diagram of an embodiment of a merchant device in accordance with the present invention.

FIG. 5 is a schematic block diagram of an embodiment of a merchant device 44-52 that is coupled to a display 180 and a keyboard and/or the user input device (e.g., mouse, touch screen, voice recognition, etc.). The merchant device 44-52 includes a processing module 170, memory 172, and an interface. In this illustration, the interface includes a user output interface 174, a user input interface 176, and a network interface 178 for coupling the merchant device 44-52 to a network connection (e.g., a local area network, a wide area network, internet, etc.).

The processing module 170 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 170 may have an associated memory 170 and/or memory element, which may be a single memory device, a plurality of memory devices, and/or embedded circuitry of the processing module 170. Such a memory device may be a read-only memory, random access memory, volatile memory, non-volatile memory, static memory, dynamic memory, flash memory, cache memory, and/or any device that stores digital information. Note that when the processing module 170 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 170 executes, hard coded and/or operational instructions corresponding to at least some of the steps and/or functions illustrated in FIGS. 4-15.

Figure 6:
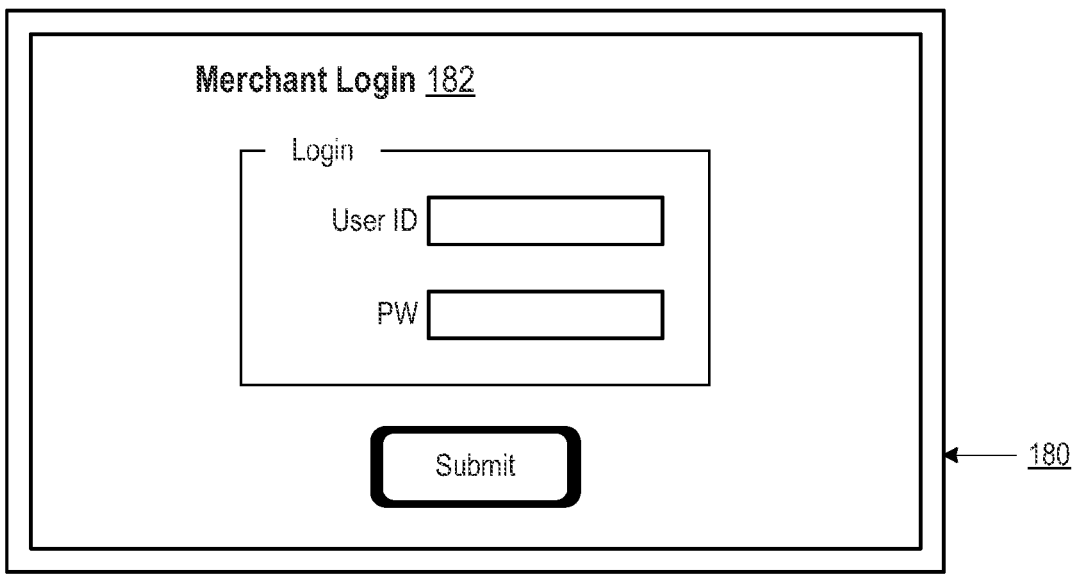
FIG. 6 is a diagram of an example of a merchant login page in accordance with the present invention.

FIG. 6 is a diagram of an example of a merchant login page 182 provided to a merchant device 44-52 from the financial transactions processing (FTP) device 12 and/or the merchant registration web page (MRW) interface 75 when the merchant device 44-52 is attempting to review, certify, and/or change its data in the merchant profile database 72. As shown, the page 182 includes a user ID field, a password (PW) field, and a submit button. The merchant's user ID is the unique merchant identification code provided by the operator of the FTP device 12 and/or the MRW interface 75 as previously discussed. Initially, the password will be a default password provided by the operator of the FTP device 12 and/or the MRW interface 75.

Once the user of the merchant device 44-52 enters the user ID and password and presses the submit button, the user ID and password are conveyed to the FTP device 12 and/or the MRW interface 75. The FTP device 12 and/or the MRW interface 75 processes the log-in request. If the user ID and password are not verified, the FTP device 12 and/or the MRW interface 75 provides a log-in failure message to the merchant device. If the user ID and password are verified, the merchant device is provided with a merchant information (MI) page 184 as shown in FIG. 7.

Figure 7:
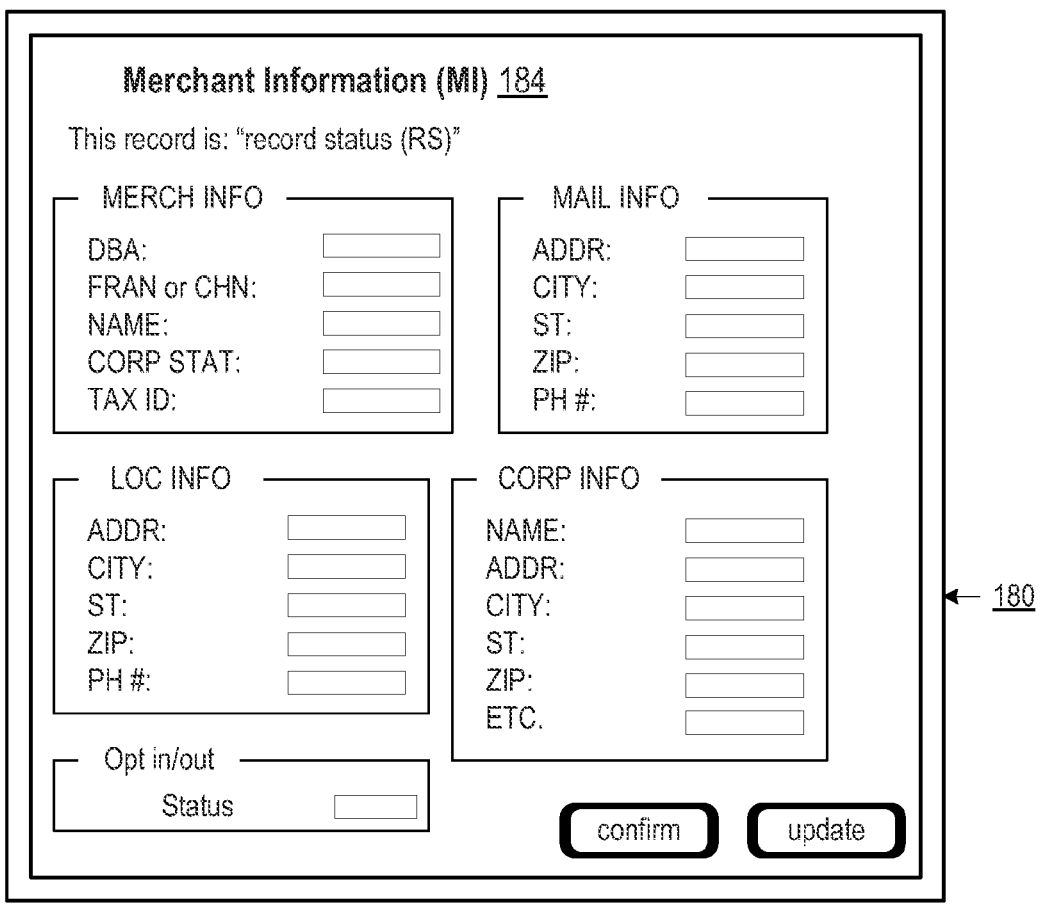
FIG. 7 is a diagram of an example of a merchant information page in accordance with the present invention.

FIG. 7 is a diagram of an example of a merchant information page 184 that includes a record status field, a merchant information (MERCH INFO) section, a mailing information (MAIL INFO) section, a location information (LOC INFO)

section, a corporate information (CORP INFO) section, and a QPCA opt-in/opt-out section. The page 184 also includes a confirm button and an update button. In an embodiment, this page 184 is provided as "read only".

The record status field stores the current status of the merchant profile record. For example, the status may be active, which indicates that the merchant is a current merchant of an acquirer and that the data presented is the most current. As another example, the status may be inactive, which indicates that the merchant is not currently affiliated with an acquirer. As yet another example, the status may be pending approval, which indicates that a merchant has made a change to its data and the system is awaiting the data change to be approved by the appropriate acquirer.

The opt-in/out section indicates whether the merchant is participating in a QPCA program or not. For example, if the opt-in/out status is opt-in, the merchant has elected to participate in the QPCA program. If the opt-out status is opt-out, then the merchant has elected not to participate in the QPCA program. With the present system, a merchant can change its QPCA status more than once and the change may be made at any time.

Each of the remaining sections (MERCH INFO, MAIL INFO, LOC INFO, CORP INFO) includes fields for storing one or more of the merchant's name, the merchant's address, and merchant business information. For example, the MERCH INFO section includes a "doing business as" (DBA) name field, a franchise or chain (FRAN or CHN) field, a legal name (NAME) field, a corporate status (COPR STAT) field, a taxpayer identification (TAX ID) field, and may include additional fields as desired. In this section, the DBA name may be different than the legal name and the merchant may have more than one DBA name. For example, the legal name of the merchant may be Southern California Merchant and the DBA name(s) may be SO CAL Merchant and/or SC Merchant.

The franchise or chain field indicates whether the merchant is a franchise merchant (e.g., independently owned and managed with licensed rights from a larger organization) or chain merchant (e.g., one or a plurality of merchants with central management and standardized business methods and practices). If the field includes an indication of being a franchise or chain merchant, the merchant will be limited to data pertaining to itself and will not have access to data of other merchants in the chain or with a similar franchise arrangement. If, however, the merchant is the corporate head of the chain or franchising, the merchant may have access to the merchant data of the chain merchants or franchised merchants.

The location, mailing, and corporate (LOC, MAIL, CORP) sections may have redundant information if the merchant has only one physical location it uses for all of its business and mailings. However, a merchant may have its business at a different physical location(s) than where it receives its mail, which may be different than its corporate offices. As such, the address (ADDR), city (CITY), state (ST), Zip code (ZIP), and phone number (PH #) fields may contain the same or different data from section to section.

As shown, the corporate information section (CORP INFO) includes may include additional fields (ETC) for storing various other information. For example, this section may include additional fields for storing a corporate facsimile number, a corporate web page address, a corporate email address, a contact person, etc.

The user of the merchant device 44-52 reviews the information of the merchant information page 182. If the information is accurate, the user selects the confirm button, which, when processed, causes a confirm merchant information page to be presented to the merchant device. An example of a confirm merchant information page is provided in FIG. 10. If the information is not accurate or if information is missing, the user selects the update button, which, when processed, causes an update merchant information page to be presented to the merchant device. An example of an update merchant information page is provided in FIG. 8.

FIG. 8 is a diagram of an example of an updated merchant information page 185 that includes the record status (RS), the merchant information section (MERCH INFO), the location information section (LOC INFO), the mailing information section (MAIL INFO), the corporate information section (CORP INFO), and the opt-in/out section. The opt-in/out section includes a change selection option, which, if selected, causes a new page to appear allowing the merchant to change its QPCA status. An example of an update QPCA page is provided in FIG. 9.

The merchant device is provided with editing access to the various sections of the page 185. Accordingly, a merchant can update one or more of the fields 186 on this page 185. If the user desires not to make a change to the data, it selects the back button, which, when processed, causes the merchant information page 184 of FIG. 7 to be provided to the merchant device. If, however, the user makes a change to the data in one or more of the fields, it selects the submit button. In this instance, when the submit button is processed, the data changes are conditionally stored pending approval from an associated acquirer, the record status is updated to pending approval, and a history of the record is updated to reflect the merchant's changes. Further, the merchant device may be presented with the merchant information page 184 of FIG. 7, a different page, or a log out page.

FIG. 9 is a diagram of an example of an update QPCA page 188 that enables a merchant, via its device, to update its QPCA status. As shown, the merchant can select an opt-in option or an opt-out option. When the selection is made, the merchant selects the submit button for processing by the FTP device 12 and/or the MRW interface 75. If the merchant desires not to make a change, it selects the back button, which, when processed, provides the page of FIG. 8 to the merchant device.

FIG. 10 is a diagram of an example of a confirm merchant information page 190 that includes the same sections as the merchant information page 184 of FIG. 7 plus a confirmation or certification section (CERT). The CERT section includes a plurality of fields to identify an individual of the merchant that is personally certifying the accuracy of the data contained in the merchant profile record. Once the individual has entered its personal information in the CERT section, it selects the submit button for processing by the FTP device 12 and/or the MRW interface 75.

FIG. 11 is a diagram of an example of an update request merchant information page 192 that is provided to the merchant device when a request to update the merchant profile record is received and a previous update of the record has not yet been approved by the appropriate acquirer. This page 192 includes the same sections as page 184 of FIG. 7 plus a previous updated information section (PREV UPDATES). This section includes a plurality of fields, which contain identity of the fields previously updated and may further include the updated data.

When a merchant device is presented with this page, the merchant has the option of withdrawing the previous changes and make new ones or waiting for the previous changes to be approved. If the merchant chooses the former, it selects the withdraw button, which, when processed, reverts the changes fields back to their previous data and presents the merchant device with the page 185 of FIG. 8. If the merchant elects to wait, then it selects the finish button, which, when processed, maintains the pending changes and provides the merchant with the page 184 of FIG. 7, a log-out page, or some other page.

Figure 12:
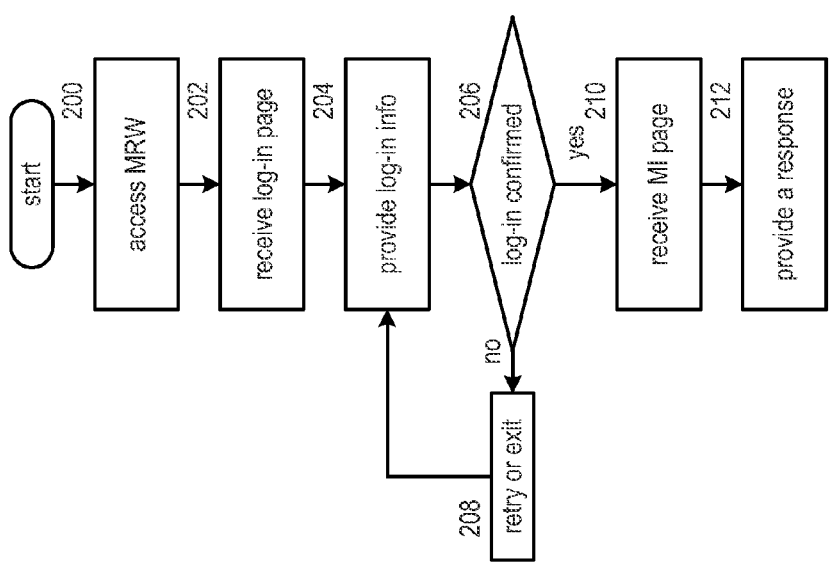
FIG. 12 is a logic diagram of an embodiment of a method for a merchant device to provide a response regarding a merchant data file in accordance with the present invention.

FIG. 12 is a logic diagram of an embodiment of a method for a merchant device to provide a response regarding a merchant data file that begins at step 200 where a merchant device access a merchant web site that is associated with a merchant profile database. The merchant web site may be supported by the financial transactions processing (FTP) device 12 and/or the merchant registration web page (MRW) interface 75. For example, the merchant device 44-52 may access the merchant web site directly using an appropriate merchant web page address or URL (Universal Resource Locator). Alternatively, the merchant device may access its associated acquirer device, which facilitates the access to the merchant web site.

The method proceeds to step 202 where the merchant device receives a log-in page. An example of a log-in page was provided in FIG. 6. The method continues at step 204 where the merchant device provides log-in information (e.g., user ID, password, etc.) of a merchant via the log-in page. The log-in information is processed by the FTP device 12 and/or the MRW interface 75. If the log-in information is valid, the FTP device 12 and/or the MRW interface 75 will provide a confirmation (e.g., sending another page to the merchant device). If the log-in information is not valid, the FTP device 12 and/or the MRW interface 75 will provide an invalid log-in message to the merchant device.

If, at step 206, the log-in information is not confirmed, the method continues at step 208 where the merchant device retries the log-in or exits the method. Note that various retry mechanisms may be employed. For example, a simple three attempts and a lock out approach may be used. As another example, hints may be requested regarding the user ID and/or password.

If, at step 206, the log-in information is confirmed, the method proceeds to step 210 where the merchant device receives a merchant information page that contains data of a merchant profile record of the merchant profile database, wherein the merchant profile record identifies the merchant. An example of a merchant information page was provided in FIG. 7. The method then proceeds to step 212 where the merchant device provides a response regarding the data of the merchant information page. The response may be to confirm that data contained therein, may be a request to update the data, and/or may be a request to change the merchant's QPCA status. This step is described in greater detail with reference to FIG. 13.

Figure 13:
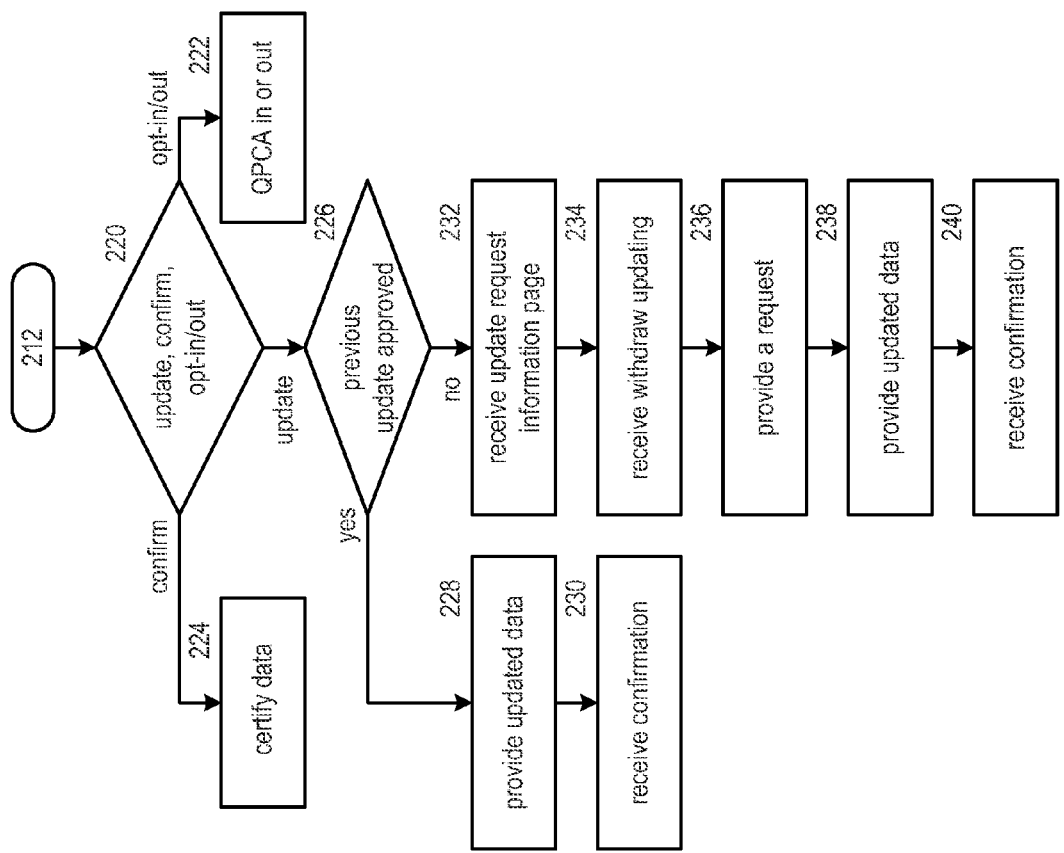
FIG. 13 is a logic diagram of an embodiment of a method for providing various responses regarding a merchant data file in accordance with the present invention.

FIG. 13 is a logic diagram of an embodiment of a method for providing various responses regarding a merchant data file. This method begins at step 220 where the merchant device determines whether the response is an update data request, a confirm the data request, or an opt-in/out of a QPCA program. If the response is regarding confirming the data, the method proceeds to step 224, where the merchant device provides the request to certify or confirm, receives a corresponding page (e.g., the page shown in FIG. 10), certifies the accuracy and/or completeness of the data.

If, at step 220, the response is an opt-in/out response, the method continues at step 222 where the merchant device provides a request for the opt-in/out page (an example is provided in FIG. 9), receives the page, and provides the opt-in or opt-out selection.

If, at step 220, the response is an update request, the method continues at step 226 where the merchant device receives an indication of whether a previous update has been approved. When no previous updates are pending approval, the method continues at step 228 where the merchant device provides updated data to one or more fields of the merchant information page. An example of this is provided in FIG. 8. The method continues at step 230 where the merchant device receives a confirmation that the data change has been processed by the FTP device 12 and/or the MRW interface 75 and is pending approval from the appropriate acquirer device.

If, at step 226, a previous update has not been approved, the method continues at step 232 where the merchant device receives an update request information page in response to update data request. An example of this page is provided in FIG. 11. The method continues at step 234 where the merchant device receives a selection to withdraw the previous updating of the data (e.g., the merchant has selected the withdraw button). The method continues at step 236 where the merchant device provides the request to withdraw the previous updating of the data to the FTP device 12 and/or the MRW interface 75.

When the request to withdraw the previous updating of the data has been processed, the method continues at step 238 where the merchant device provides (e.g., a user interface and via a network interface) the merchant's updating of the data to one or more fields of the merchant information page. The method continues at step 240 where the merchant device receives another confirmation of data entry pending approval.

Figure 14:
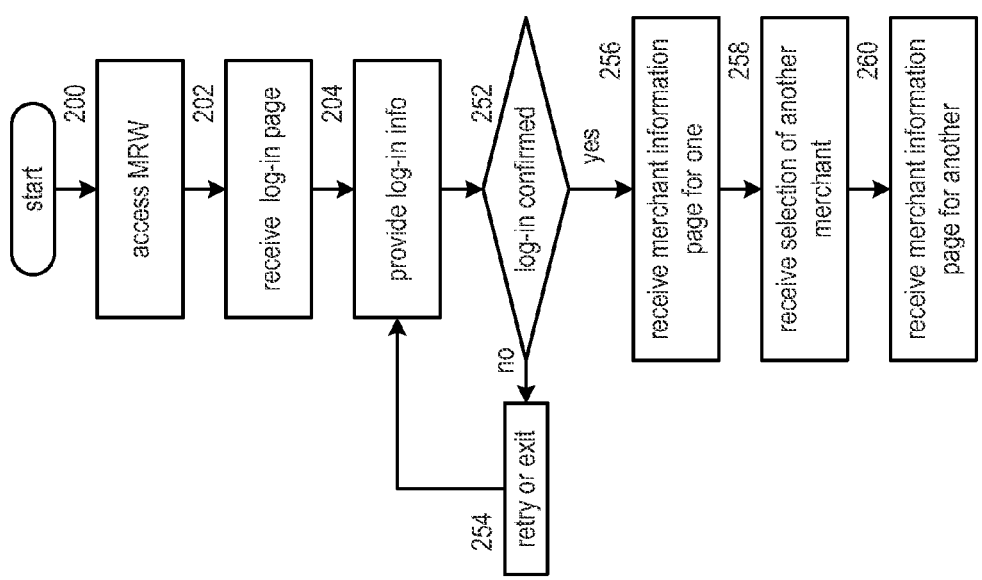
FIG. 14 is a logic diagram of an embodiment of a method for a merchant device to provide responses regarding a plurality of merchant data files in accordance with the present invention.

FIG. 14 is a logic diagram of an embodiment of a method for a merchant device to provide responses regarding a plurality of merchant data files. The method begins at step 200 where the merchant device accesses a merchant web site that is associated with a merchant profile database. The merchant web site may be supported by the financial transactions processing (FTP) device 12 and/or the merchant registration web page (MRW) interface 75. For example, the merchant device 44-52 may access the merchant web site directly using an appropriate merchant web page address or URL (Universal Resource Locator). Alternatively, the merchant device may access its associated acquirer device, which facilitates the access to the merchant web site.

The method proceeds to step 202 where the merchant device receives a log-in page. An example of a log-in page was provided in FIG. 6. The method continues at step 250 where the merchant device provides log-in information (e.g., user ID, password, corporate ID, etc.) of a merchant via the log-in page. In this instance, the merchant is a conglomerate entity having a plurality of franchises and/or chain merchants associated therewith. The log-in information is processed by the FTP device 12 and/or the MRW interface 75. If the log-in information is valid, the FTP device 12 and/or the MRW interface 75 will provide a confirmation (e.g., sending another page to the merchant device). If the log-in information is not valid, the FTP device 12 and/or the MRW interface 75 will provide an invalid log-in message to the merchant device.

If, at step 252, the log-in information is not confirmed, the method continues at step 254 where the merchant device retries the log-in or exits the method. Note that various retry mechanisms may be employed. For example, a simple three attempts and a lock out approach may be used. As another example, hints may be requested regarding the user ID and/or password.

If, at step 252, the log-in information is confirmed, the method proceeds to step 256 where the merchant device receives (e.g., via a network interface) the merchant information page that contains data of one of a plurality of merchant profile records of the merchant profile database. In this instance, the plurality of merchant profile records corresponds to a plurality of merchants associated with the conglomerate entity. The method then proceeds to step 258 where the merchant device receives (e.g., via a user interface) a selection of another one of the plurality of merchants. The method continues at step 260 where the merchant device receives (e.g., via a network interface) the merchant information page that contains data of another one of a plurality of merchant profile records that corresponds to the another one of the plurality of merchants.

Figure 15:
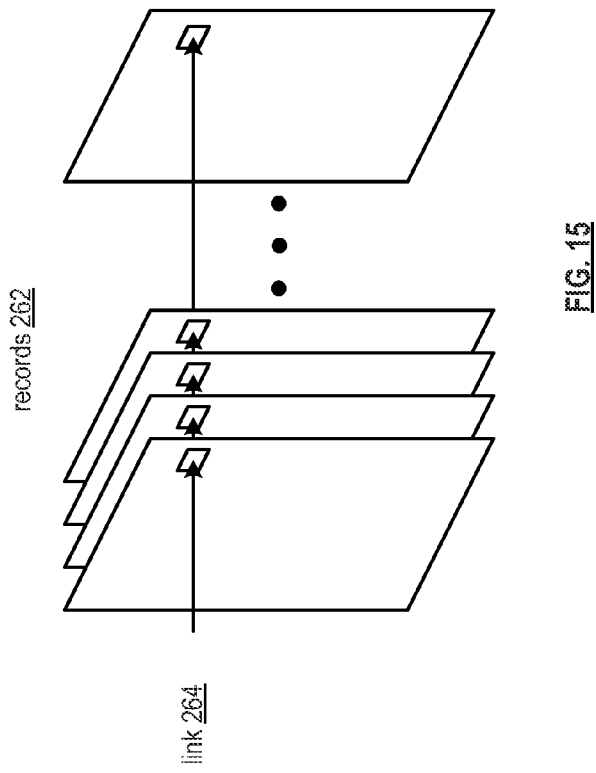
FIG. 15 is a diagram of an example of a plurality of linked merchant data files in accordance with the present invention.

FIG. 15 is a diagram of an example of a plurality of linked merchant profile records 262. Each of the merchant profile records 262 includes a conglomerate entity link 264. For example, the link 264 may be established based on the franchise or chain information of the business in association with the business name. For example, if a merchant with the business name of Bob's Hamburger Stand is listed as a chain entity of Hamburger Stand, Inc, then the merchant Hamburger Stand, Inc. is a conglomerate entity with respect to Bob's Hamburger Stand and may access the merchant profile record of Bob's and other chain entities affiliated with Hamburger Stand, Inc. However, Bob's Hamburger Stand does not have access to the merchant profile record of Hamburger Stand. As another example, the link 264 may be a field of the merchant profile records indicating the affiliation with the conglomerate entity.

Figure 16:
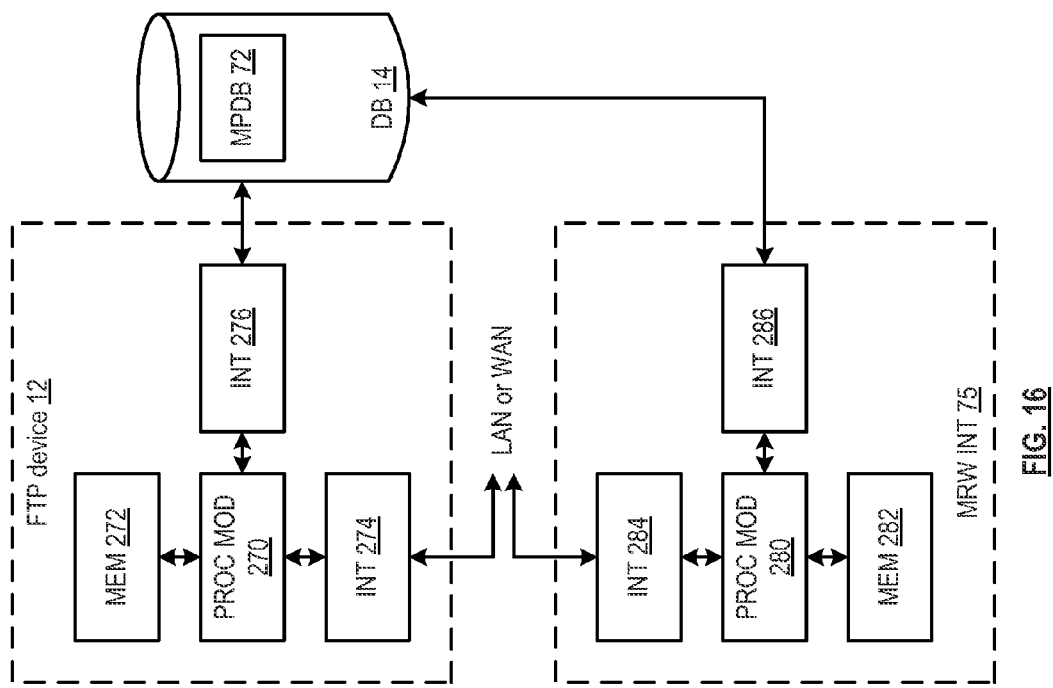
FIG. 16 is a schematic block diagram of an embodiment of a financial transactions processing device and an embodiment of a merchant registration web page (MRW) in accordance with the present invention.

FIG. 16 is a schematic block diagram of an embodiment of a financial transactions processing (FTP) device 12 and an embodiment of a merchant registration web page (MRW) interface 75. The FTP device 12 includes a processing module 270, memory 272, and an interface (e.g., a network interface 274 and a database interface 276). The MRW interface 75 includes a processing module 280, memory 282, and an interface (e.g., a network interface 284 and a database interface 286).

The processing modules 270 and 280 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 270 or 280 may have an associated memory 272 or 282 and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 270 or 280 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-35.

Figure 17:
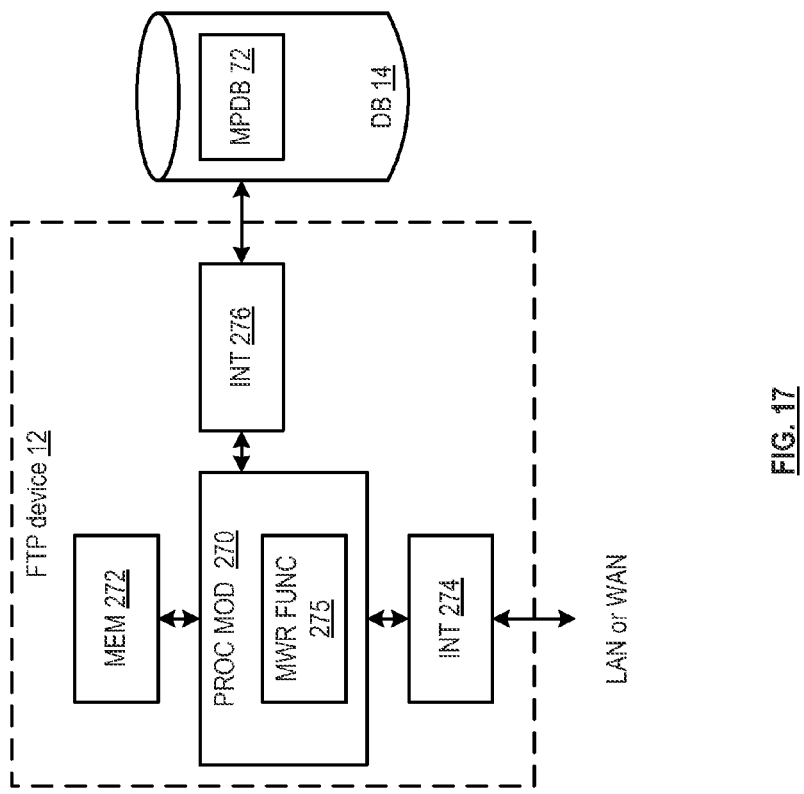
FIG. 17 is a schematic block diagram of an embodiment of a financial transactions processing device that includes an MRW function in accordance with the present invention.

FIG. 17 is a schematic block diagram of an embodiment of a financial transactions processing (FTP) device 12 that includes an MRW function 275. In this embodiment, the FTP device 12 incorporates the MRW interface 75 of FIG. 16.

Figure 18:
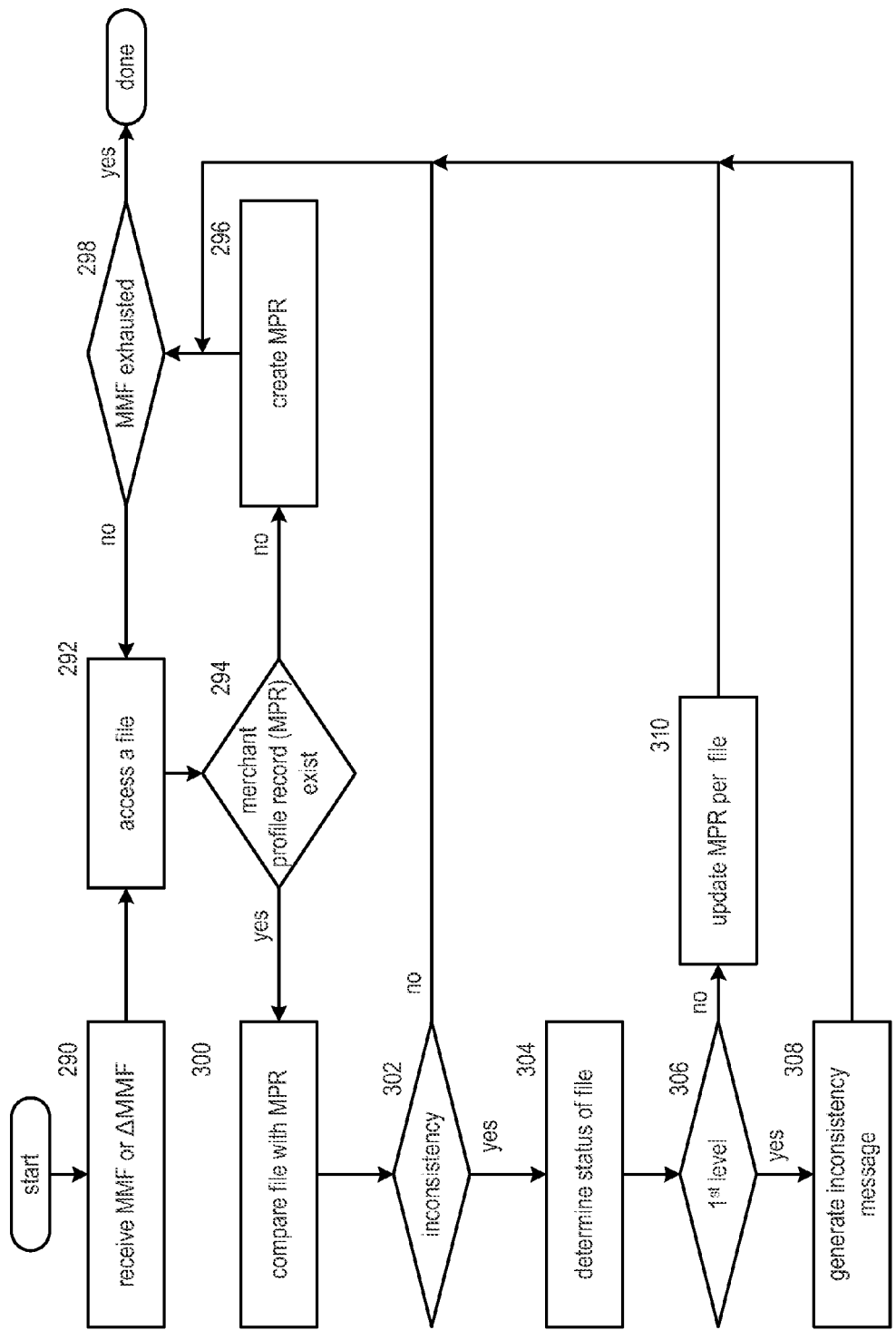
FIG. 18 is a logic diagram of an embodiment of a method for a financial transactions processing device to process a plurality of merchant data files in accordance with the present invention.

FIG. 18 is a logic diagram of an embodiment of a method for a financial transactions processing (FTP) device 12 to process a plurality of merchant data files. The method begins at step 290 where the FTP device 12 receives at least a portion of a merchant master file from an acquirer device. For example, the FTP device 12 may receive an initial merchant master file (MMF) or an updated, or delta, merchant master file (ΔMMF). Regardless of whether the FTP device 12 receives the MMF or the ΔMMF, each one or more merchant data files.

The method proceeds to step 292 where the FTP device 12 accesses one of the merchant data files in the MMF or the ΔMMF. As previously discussed, a merchant data file includes merchant name information, merchant address information, and/or merchant business information. The method continues at step 294 where the FTP device 12 determines whether a corresponding merchant profile record exists within a merchant profile database. For example, the FTP device 12 utilizes one or more of the merchant name information, merchant address information, and the merchant business information to identify the merchant and, based on the identity of the merchant, determines whether the merchant profile database includes a record for the merchant.

If the merchant profile database (MPDB) does not include a record for the merchant, the method proceeds to step 296 where the FTP device 12 creates a merchant profile record for the merchant within the merchant profile database based on the merchant data file. For example, a new record is created for the merchant, a unique ID code is assigned to the merchant (which is provided to the merchant in a secure manner), and the record is populated with the data of the merchant data file.

The method continues at step 298 where the FTP device 12 determines whether the MMF or ΔMMF is exhausted (e.g., all of the files or a designated number of the files have been processed). If yes, the method is complete for the MMF or ΔMMF from this acquirer. If not, the method repeats at step 292 where the FTP device 12 retrieves another file from the MMF or ΔMMF.

If, at step 294, the merchant profile database (MPDB) includes a corresponding merchant profile record (MPR), the method proceeds to step 300. At step 300, the FTP device 12 compares the merchant data file with the corresponding merchant profile record for inconsistencies. Such a comparison compares the merchant name information, the merchant address information, and the merchant business information for mismatching data and/or missing data. The method continues at step 302 where the FTP device 12 determines whether an inconsistency exists between the corresponding merchant profile record and the merchant data file. If not, the method proceeds to step 298.

If, however, an inconsistency exists, the method proceeds to step 304 where the FTP device 12 determines the status of the merchant data file with respect to the at least a portion of the merchant master file. For example, if the file is received via an initial MMF, then the status is a first level and, if received via a ΔMMF then the status is a second level. The method proceeds to step 308, via step 306, when the status is the first level. At step 308, the FTP device 12 generates an inconsistency message identifying the inconsistencies between the merchant data file and the merchant profile record. At this stage of the processing, it is generally unknown whether the merchant data file or the merchant profile record is more accurate. Thus, the inconsistency message requests the acquirer and/or the merchant to update and/or verify its data. The method then continues at step 298.

If the status of the merchant data file is not the first level, the method proceeds to step 310 via step 306. At step 310, the FTP device 12 updates the merchant profile record based on the merchant data file. The method then continues at step 298.

Figure 19:
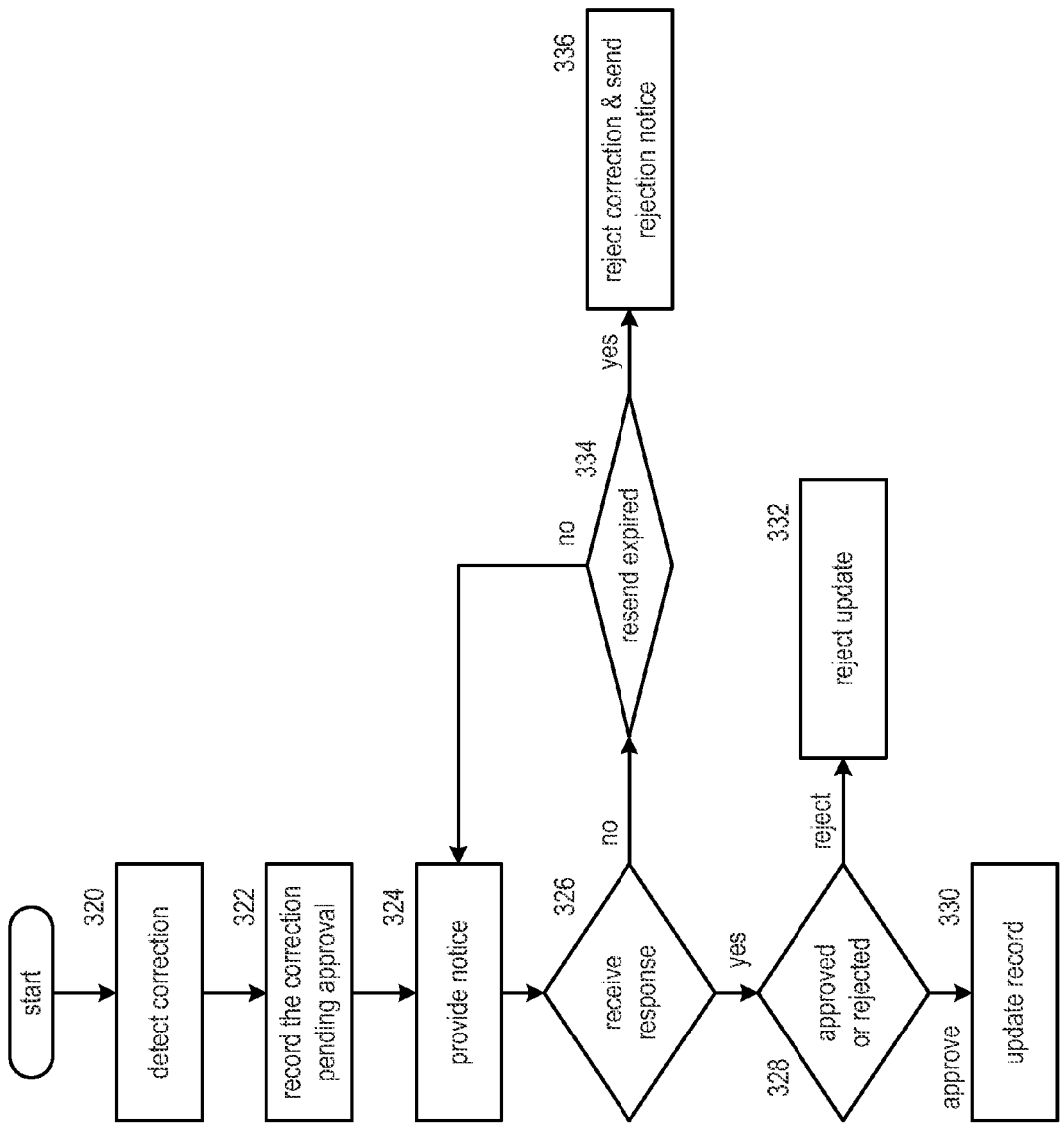
FIG. 19 is a logic diagram of an embodiment of a method for a financial transactions processing device to process a merchant data file in accordance with the present invention.

FIG. 19 is a logic diagram of an embodiment of a method for a financial transactions processing (FTP) device 12 to further process a merchant data file. The method begins at step 320 where the FTP device 12 detects correction of the inconsistency by a merchant device as previously described. The method proceeds to step 322 where the FTP device 12 records the correction within the merchant profile record pending approval from an acquirer device. This step may include storing the previous data in temporary memory prior to overwriting it with the updated or corrected data. Alternatively, this step may include temporarily storing the updated or corrected data.

The method continues at step 324 where the FTP device 12 provides notice of the correction to the acquirer device, which can be sent through the proprietary network 16 and/or through the public network 36. The method proceeds to step 326 where the FTP device 12 determines whether it has received a response to the notice. If not, the method continues at step 334 where the FTP device 12 determines whether the resend mechanism (e.g., three resends and exit, a time limit, etc.) of the notice has expired. If not, the method repeats at step 324. If the resend mechanism of the notice has expired, the method proceeds to step 336 where the FTP device 12 rejects the correction of the inconsistency and provides notice to the merchant and/or acquirer of the rejection.

If a notice response is received, the method proceeds to step 328 where the FTP device 12 determines whether the notice response is an approval of the change or a rejection of the change. When the response is approval, the method continues at step 330 where the FTP device 12 updates the merchant profile record in accordance with the approval (e.g., makes the change in the record and deletes, or flags for deletion or overwriting, the temporary memory). If the notice response is a rejection, the method continues at step 332 where the FTP device 12 reverts the data content of the merchant profile record to it previous state. In addition, the FTP device 12 may store a reason for the rejection and/or may provide a message to the merchant device that the inconsistency correction was rejected.

Figure 20:
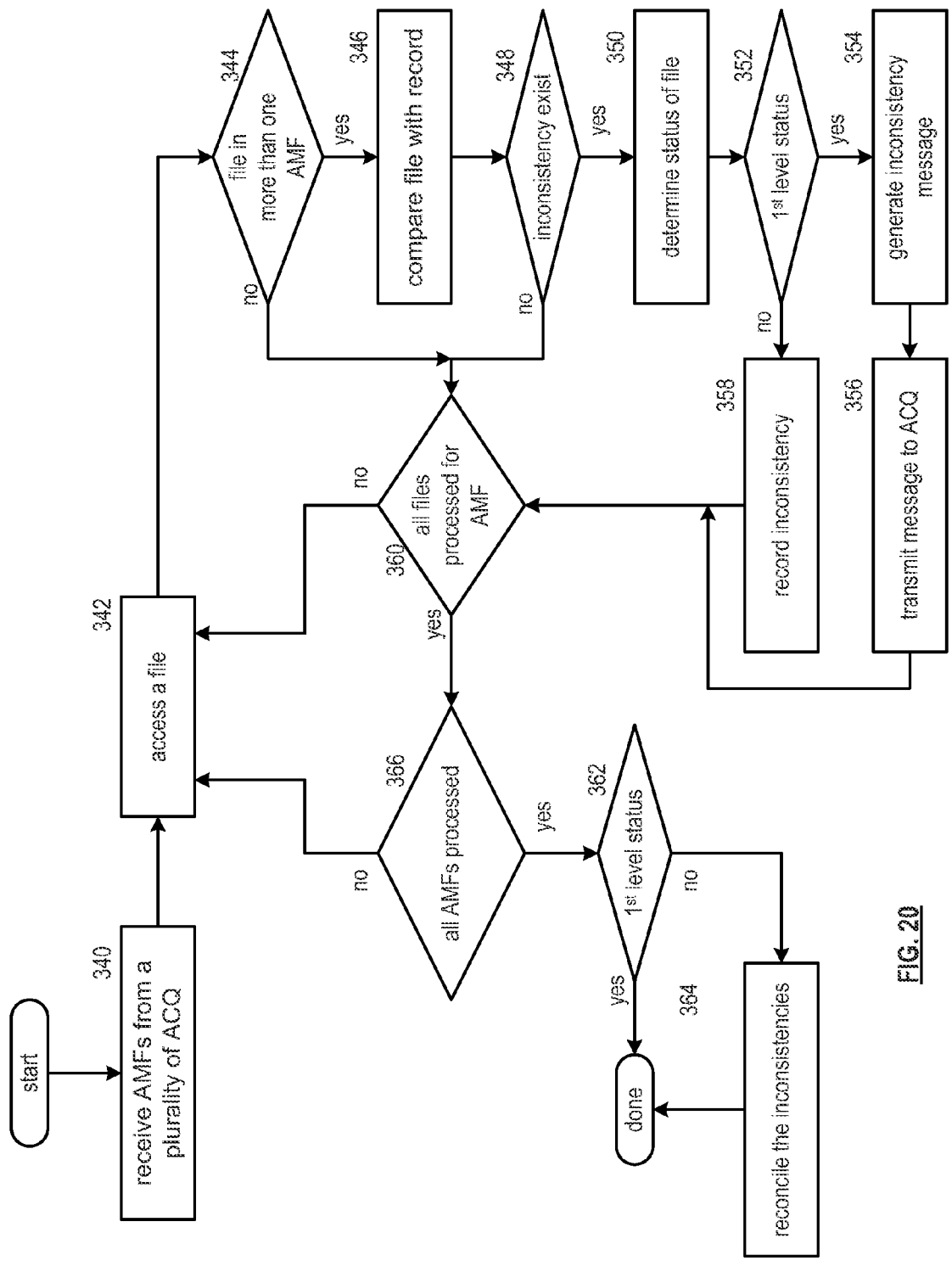
FIG. 20 is a logic diagram of another embodiment of a method for a financial transactions processing device to process a plurality of merchant data files in accordance with the present invention.

FIG. 20 is a logic diagram of another embodiment of a method for a financial transactions processing (FTP) device 12 to process a plurality of merchant data files. The method begins at step 340 where the FTP device 12 receives a plurality of acquirer-merchant files (AMF) from a plurality of acquirer devices. The plurality of acquirer-merchant files includes a plurality of merchant master files (MMF) and/or a plurality of delta merchant master files (LlMMF). The FTP device 12 may receive the plurality of acquirer-merchant files in a serial manner, in a parallel manner, in accordance with a pre-established scheme, randomly, and/or in any other manner.

The method continues at step 342 where the FTP device 12 accesses one of the merchant data files of one of the plurality of AMF. The method continues at step 344 where the FTP device 12 determines whether multiple acquirer-merchant files (AMF) include a merchant data file for the same merchant. If not (i.e., only one AMF includes a merchant data file of a merchant), the method continues at step 360 where the FTP device 12 determines whether all of the merchant data files for the current AMF have been processed. If not, the method repeats at step 342 where the FTP device accesses another file of the current AMF.

If, however, more than one AMF includes a merchant data file for the same merchant, the method continues at step 346 where the FTP device 12 compares the current version of the merchant data file with the corresponding merchant profile record. In other words, the FTP device 12 compares the merchant data file of this AMF with the record for this merchant stored in the merchant profile database. The method branches at step 348 depending on whether an inconsistency exists. If not, the method continues at step 360.

If, however, an inconsistency exists between the corresponding merchant profile record and the version of the merchant data file, the method proceeds to step 350 where the FTP device 12 determines the status of a corresponding one of multiple acquirer-merchant files (e.g., an initial file or a delta file). When the status of the AMF is the first level (e.g., an initial file), the method proceeds to step 354 via step 352. At step 354, the FTP device 12 generates an inconsistency message that identifies the inconsistency between the corresponding merchant profile record and the version of the merchant data file. The method then proceeds to step 356 where the FTP device 12 transmits the inconsistency message to an acquirer device associated with the corresponding one of the multiple acquirer-merchant files. In this instance, the FTP device 12 has identified an inconsistency between its merchant profile record and the merchant data file of the AMF and is leaving the resolution of the inconsistency to the acquirer and/or the merchant.

If, however, the status of the AMF is not the first level (e.g., is a delta file which includes supposedly corrected merchant data files), the method proceeds to step 358 where the FTP device 12 records the inconsistency for subsequent resolution in accordance with the versions of the merchant data file of other AMFs. The method continues at step 360.

At step 360, if all of the merchant data files of the current AMF have been processed, the method proceeds to step 366 where the FTP device 12 determines whether all of the AMFs have been processed. If not, the method continues at step 342. If, however, all of the AMFs have been processed, the method continues at step 362 where the FTP device 12 determines whether a merchant data file having an inconsistency is from a first level or second level AMF. If the file is from a first level AMF (e.g., initial MMF), the method is done for this file. If, however, the files is from a second level AMF (e.g., a delta MMF), the inconsistence of this file is reconciled at step 364 with the inconsistencies of other files from different AMFs for the same merchant in accordance with the merchant data file. For example, one AMF may have priority with respect to the merchant, thus its merchant data file is used to reconcile the inconsistency. Steps 362 and 364 are repeated for each merchant data file having an inconsistency.

Figure 21:
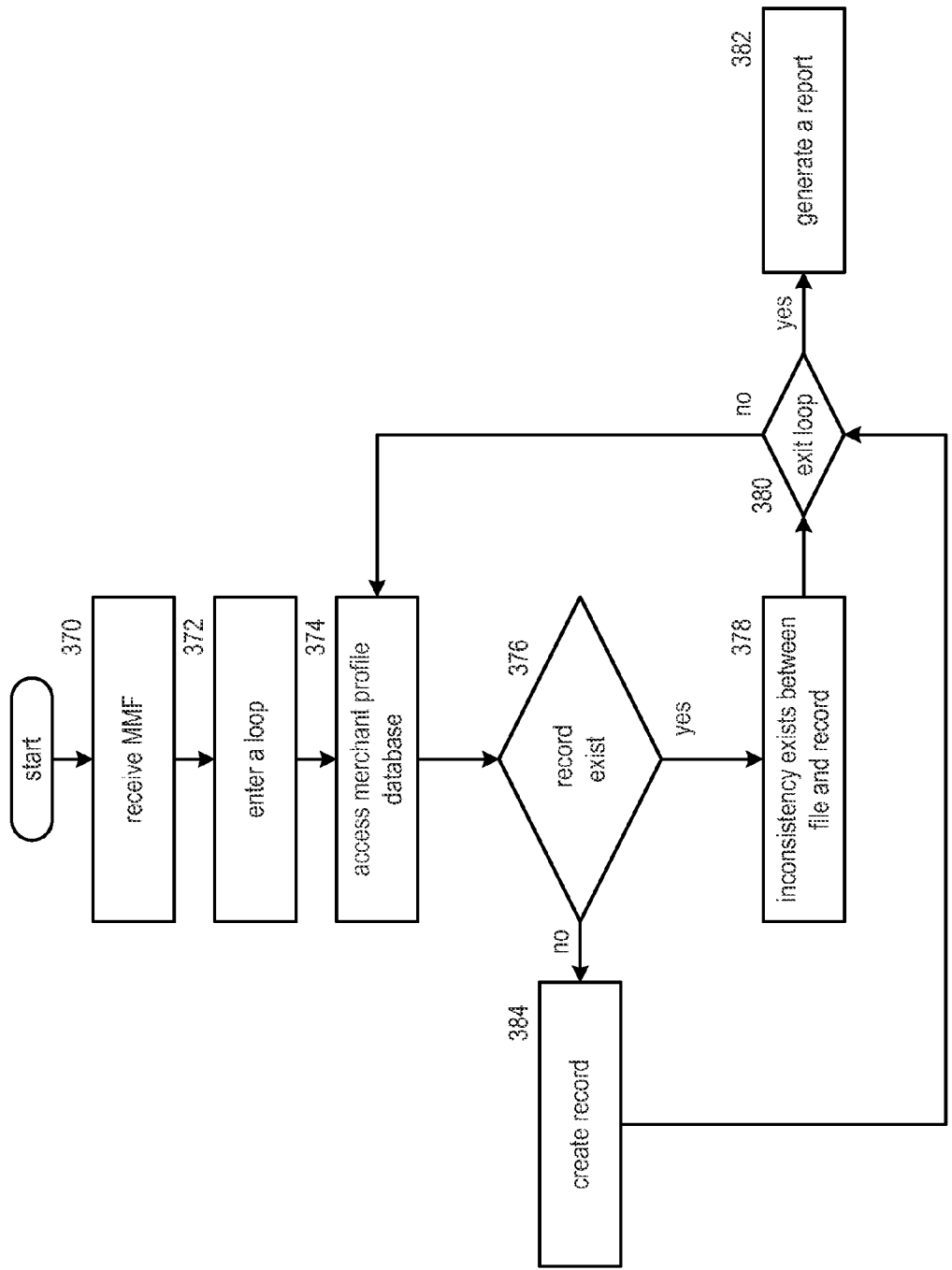
FIG. 21 is a logic diagram of another embodiment of a method for a financial transactions processing device to process a plurality of merchant data files in accordance with the present invention.

FIG. 21 is a logic diagram of another embodiment of a method for a financial transactions processing (FTP) device 12 to process a plurality of merchant data files. The method begins at step 370 where the FTP device 12 receives at least a portion of a merchant master file (e.g., an initial MMF or a delta MMF). The method continues at step 372 where the FTP device 12 enters a loop for processing the plurality of merchant data files. For a file of the plurality of merchant data files, the loop includes steps 374-384. At step 374, the FTP device 12 accesses a merchant profile database for a corresponding merchant profile record. For example, the FTP device 12, based on the identity of the merchant in the merchant data file, the FTP device 12 searches the merchant profile database 72 for a record corresponding to the identified merchant.

The method continues at step 376 where the FTP device 12 determines a record exists. If not, the method continues at step 384 where FTP device 12 creates a merchant profile record in the database for the merchant based on the merchant data file. The method then continues at step 380.

When the corresponding merchant profile record exists, the method continues at step 378 where the FTP device 12 determines whether an inconsistency exists between the merchant data file and the corresponding merchant profile record. The method continues at step 380 where the FTP device 12 determines whether to exit the loop when a designated one of the plurality of merchant data files has been processed (e.g., the last one, a predetermined number has been process, a time-out on processing has expired, etc). If it is determined to repeat the loop, the method repeats at step 374.

When the loop is exited, the method continues at step 382 where the FTP device 12 generates a report that identifies merchant data files of the plurality of merchant data files that have the inconsistency. In addition, the FTP device 12 may generate another report, or add on to the current report, identity of merchant data files of the plurality of merchant data files that do not have the inconsistency.

Figure 22:
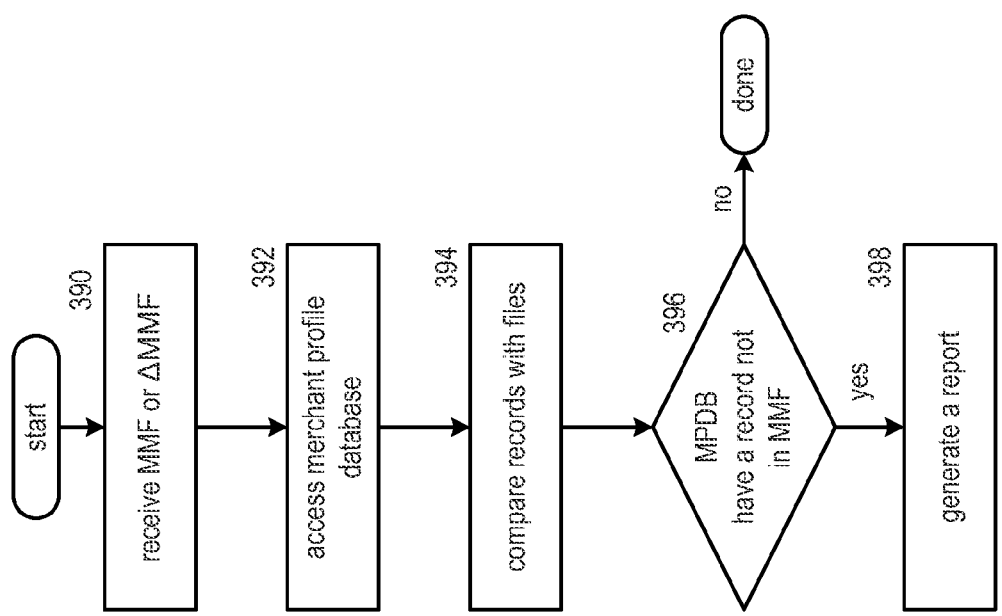
FIG. 22 is a logic diagram of another embodiment of a method for a financial transactions processing device to process a plurality of merchant data files in accordance with the present invention.

FIG. 22 is a logic diagram of another embodiment of a method for a financial transactions processing (FTP) device 12 to process a plurality of merchant data files. The method begins at step 390 where the FTP device 12 receives a merchant master file (MMF) and/or a delta merchant master file (ΔMMF) from an acquirer. The method then proceeds to step 392 where the FTP device 12 accesses a merchant profile database (MPDB) to retrieve a plurality of merchant profile records based on identity of the acquirer.

The method continues at step 394 where the FTP device 12 compares the retrieved plurality of merchant profile records with the plurality of merchant data files of the MMF and/or the ΔMMF. The method proceeds to step 396 where the FTP device 12 determines, based on the comparison, whether the merchant profile database includes a record for a merchant that does not have a corresponding data file in the MMF and/or the ΔMMF. If not, the method is complete.

If, however, the merchant profile database includes at least one record that does not have a corresponding merchant data file, the method continues to step 398 where the FTP device generates a report indicating that the merchant profile record does not have the corresponding merchant data file in the plurality of merchant data files. In other words, the report identifies merchants that have a record in the merchant profile database as being affiliated with the acquirer, but the acquirer does not have a merchant data file for the merchant.

Figure 23:
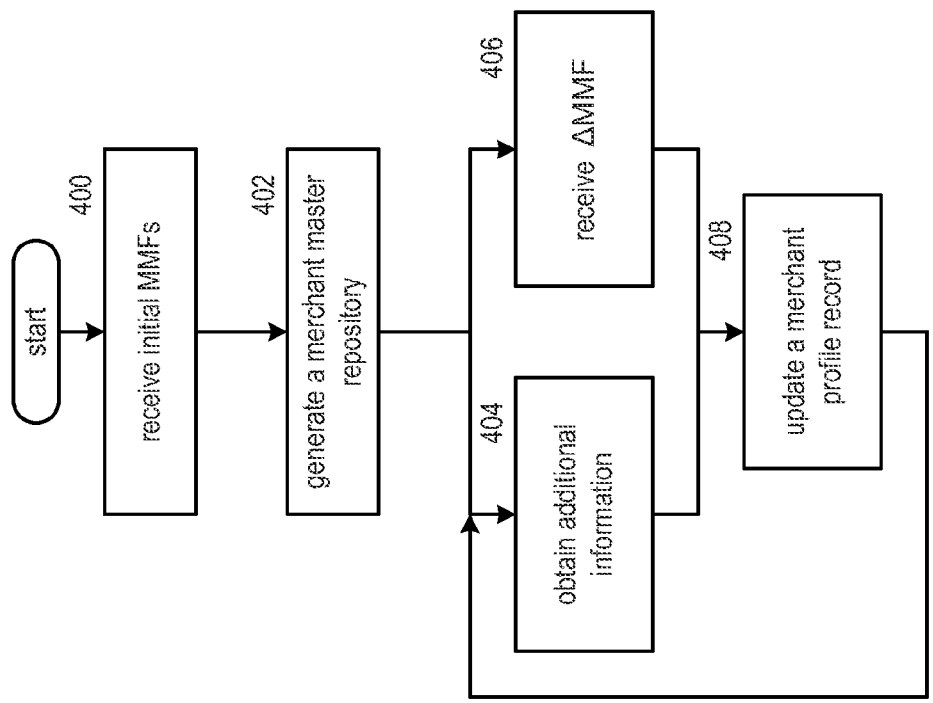
FIG. 23 is a logic diagram of another embodiment of a method for a financial transactions processing device to process a plurality of merchant data files in accordance with the present invention.

FIG. 23 is a logic diagram of another embodiment of a method for a financial transactions processing (FTP) device 12 to process a plurality of merchant data files. The method begins at step 400 where the FTP device 12 receives a plurality initial merchant master files from a plurality of acquirers. The method continues at step 402 where the FTP device 12 generates a merchant master repository based on the plurality of merchant master files and the merchant profile database. Such a repository may be used as temporary storage for merchant profile records pending approval, may be a backup copy of the merchant profile database, and/or used as a buffer for storing the merchant master files, or portions thereof.

The method continues at steps 404 and 406. At step 404, the FTP device 12 obtains additional information regarding a merchant. Such additional information may be obtained from a third party, from a governmental agency (e.g., the IRS), and/or from governmental agency services (e.g., CASS by the U.S. post office). This additional information may be stored in the repository pending approval of the associated acquirer. Once approved, the method continues to step 408 where the FTP device 12 updates the merchant profile record with the additional information.

At step 406 the FTP device 12 receives a delta merchant master file from an acquirer. The FTP device 12 identifies data differences between the merchant profile record and a merchant data file in the delta merchant master file. In an embodiment, the differences are resolved by utilizing the data of the delta merchant master file. In another embodiment, the difference may be identified in a report that requests the acquirer and/or merchant to access the MRW interface to update the corresponding merchant profile record.

Figure 24:
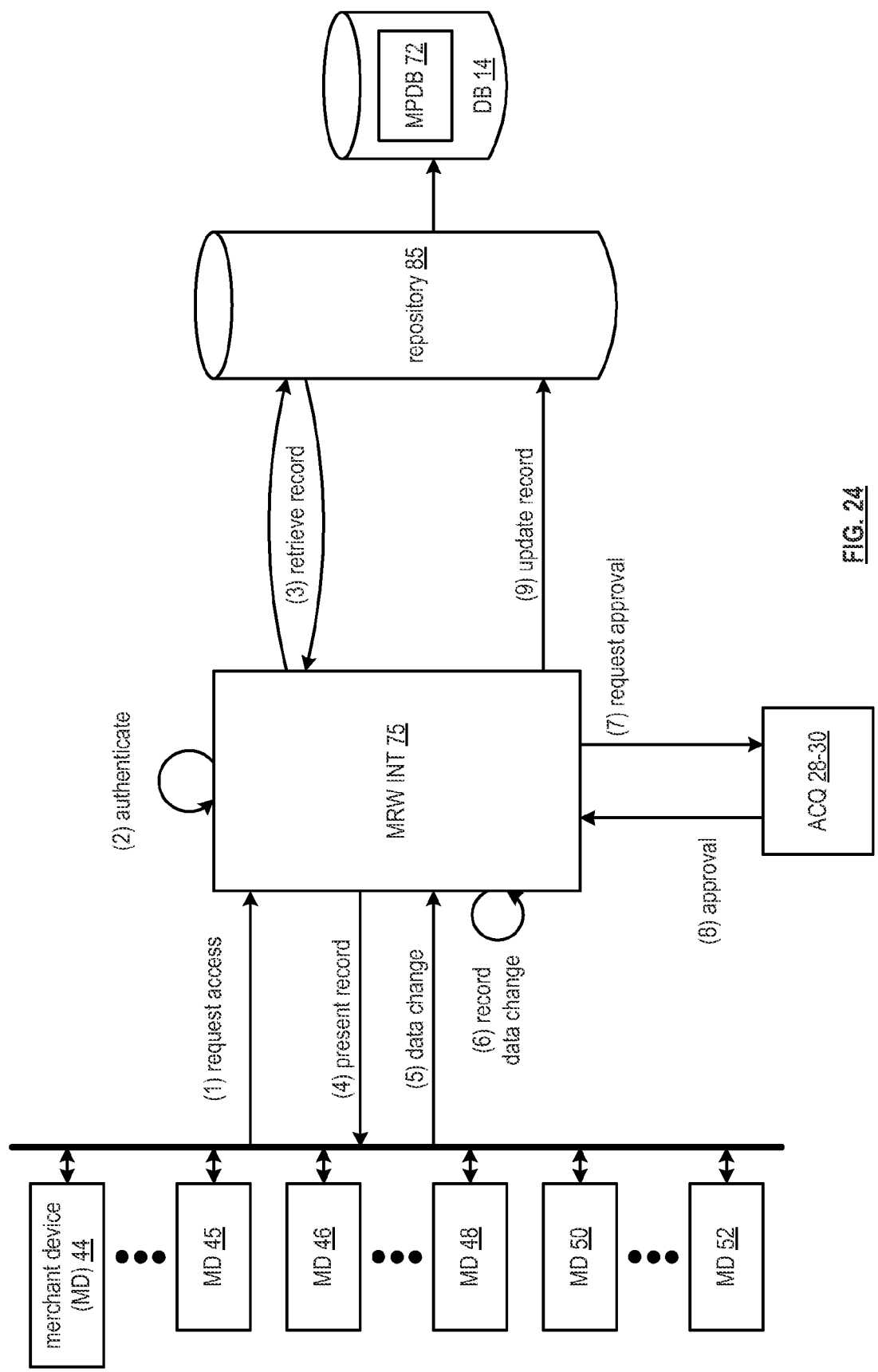
FIG. 24 is a diagram of an example of a merchant registration web page interface facilitating the processing of a merchant data file in accordance with the present invention.

FIG. 24 is a diagram of an example of a merchant registration web page interface 75 facilitating the processing of a merchant data file. As discussed with reference to FIGS. 16 and 17, the MRW interface 75 may be a stand-alone component or included within the financial transactions processing device 12. In this example, any one of the plurality of merchant devices (MD) 44-52 may send a request (1) to the MRW interface 75 to access its merchant profile record in the merchant profile database (MPDB) 72. A request will typically include providing a unique user ID of the merchant and a password on a log-in page. FIG. 6 provides an example of a merchant log-in page.

Upon receiving the request, the MRW interface 75 attempts to authenticate (2) it. For example, the MRW interface 75 determines whether the user ID and the password are correct. If the request is authenticated, the MRW interface 75 retrieves (3) a copy of the record from the MPDB 72. The MRW interface 75 then presents (4) the retrieved record via a merchant information page. FIG. 7 provides an example of a merchant information page. The merchant may certify its data presented in the merchant information page or change it. FIG. 10 provides an example of certifying the data.

If the merchant desires to change its data, the merchant sends a data change (5) to the MRW interface 75. Such a data change may be performed by changing the data in a field of the merchant information page. The MRW interface 75 records the change in temporary storages and also stores the previous contents of the field being changed.

The MRW interface 75 then sends a request for approval (7) to the associated acquirer 28-30. If the acquirer approves the change, it sends an approval message (8). With the change approved, the MRW interface 75 facilitates updating (9) the merchant profile record within the merchant profile database 72.

Figure 25:
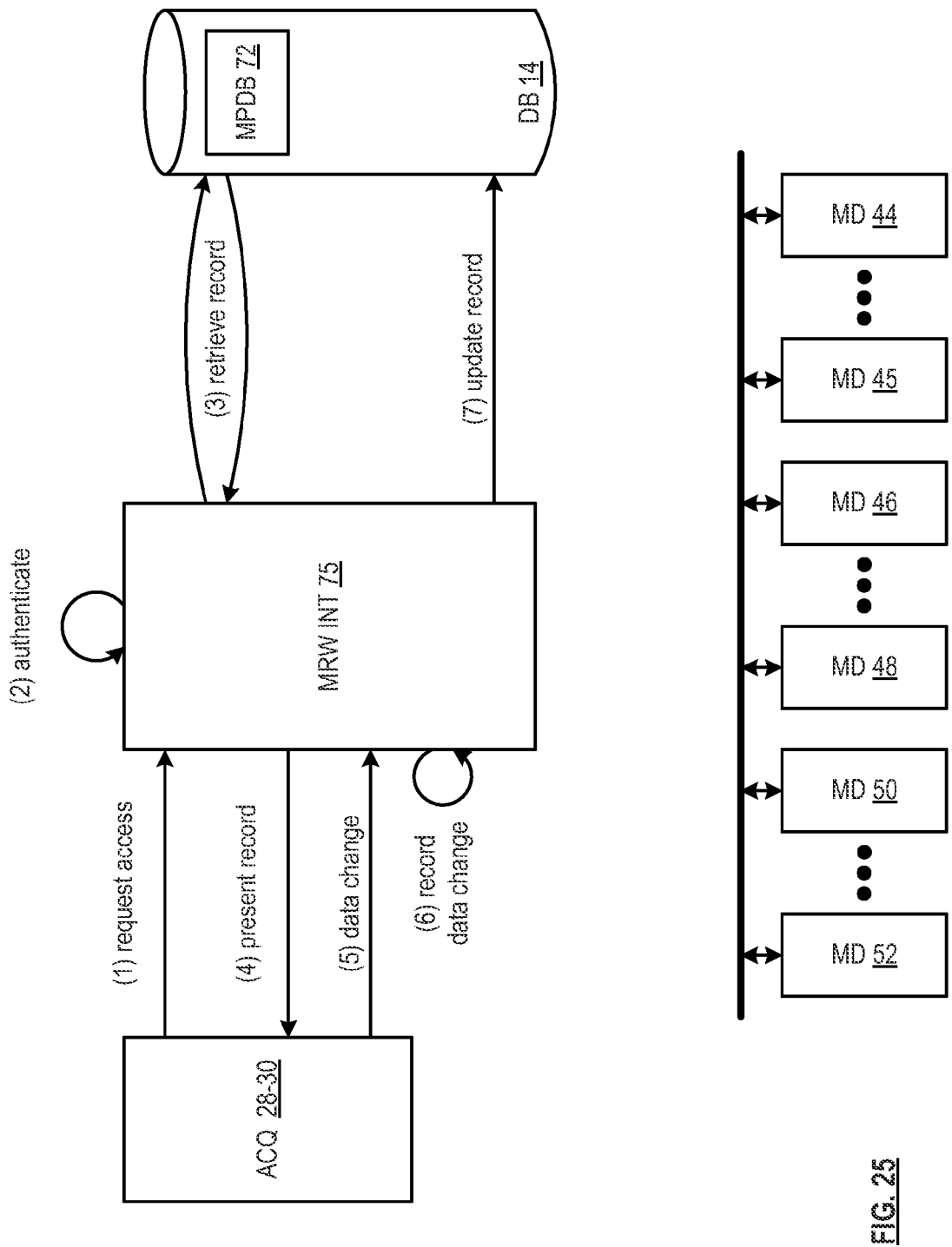
FIG. 25 is a diagram of another example of a merchant registration web page interface facilitating the processing of a merchant data file in accordance with the present invention.

FIG. 25 is a diagram of another example of a merchant registration web page (MRW) interface 75 facilitating the processing of a merchant data file. In this example, the request (1) to change a record is initiated by an acquirer 28-30. A request will typically include providing a unique user ID of the merchant and a password on a log-in page.

Upon receiving the request, the MRW interface 75 attempts to authenticate (2) it. For example, the MRW interface 75 determines whether the user ID and the password are correct for the given acquirer. If the request is authenticated, the MRW interface 75 retrieves (3) a copy of the record from the MPDB 72. The MRW interface 75 then presents (4) the retrieved record via a merchant information page to the acquirer.

If the acquirer desires to change its data, the acquirer sends a data change (5) to the MRW interface 75. Such a data change may be performed by changing the data in a field of the merchant information page. The MRW interface 75 records the change in temporary storages. The MRW interface 75 then facilitates updating (7) the merchant profile record within the merchant profile database 72.

Figure 26:
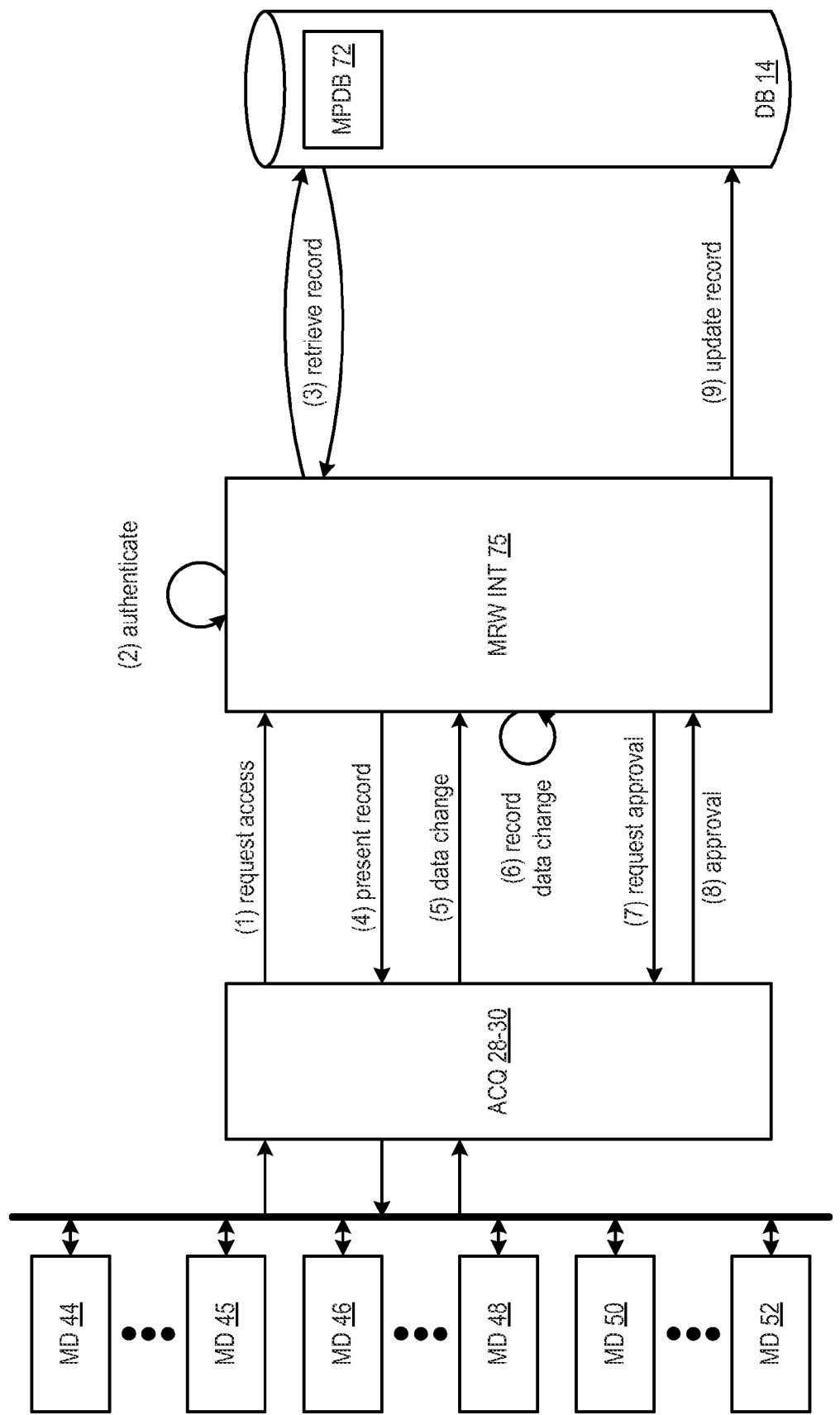
FIG. 26 is a diagram of another example of a merchant registration web page interface facilitating the processing of a merchant data file in accordance with the present invention.

FIG. 26 is a diagram of another example of a merchant registration web page (MRW) interface 75 facilitating the processing of a merchant data file. This example is similar to the example of FIG. 24 except that the acquirer 28-30 provides the conduit for communication between the merchant devices 44-52 and the MRW interface 75. As such, steps 1-9 as described with reference to FIG. 24 are the same in this figure, with the exception that the acquirer 28-30 receives and forwards communications from a merchant device 44-52 to the MRW interface 75 and receives and forwards communications from the MRW interface 75 to a merchant device 44-52.

Figure 27:
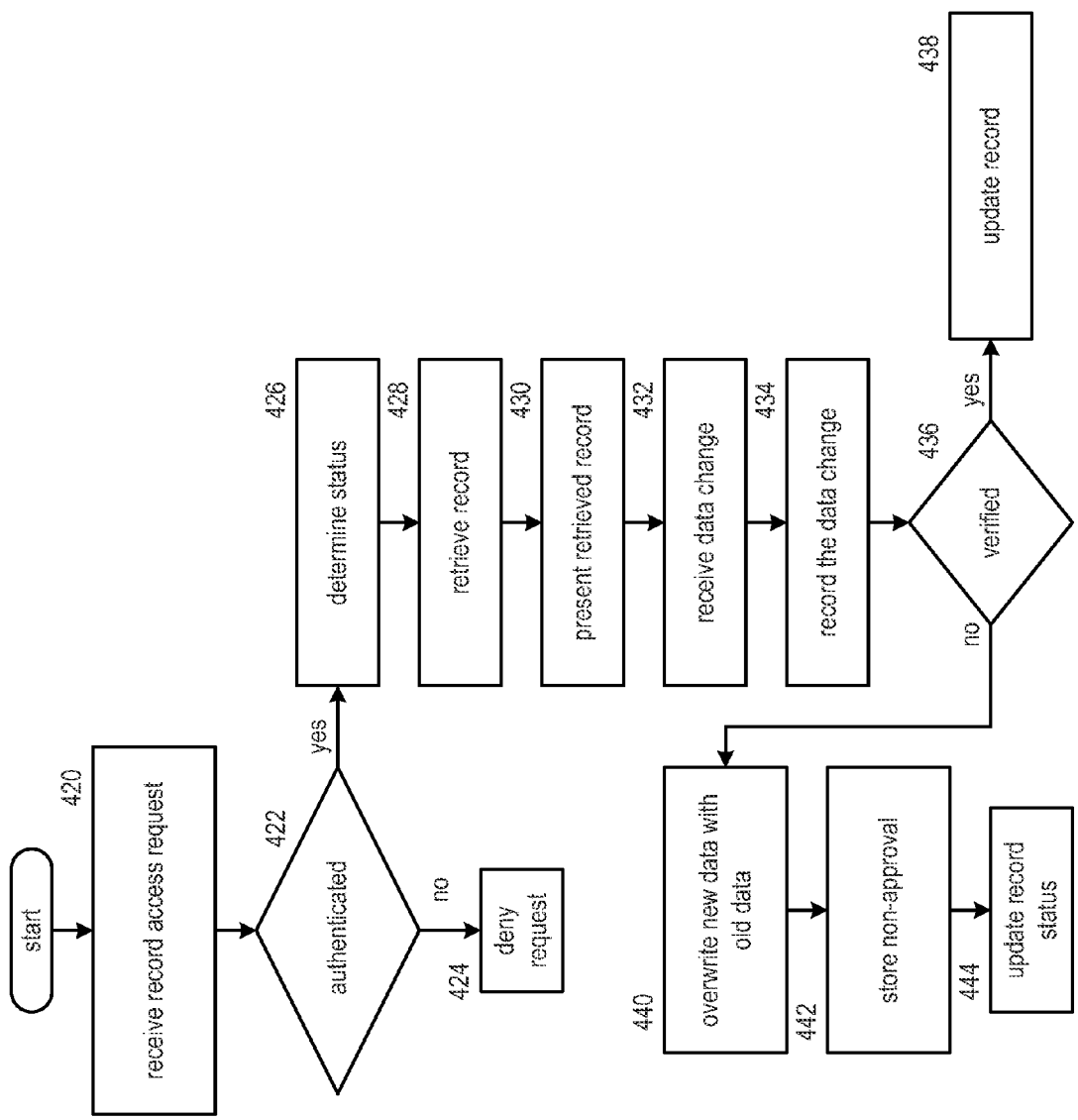
FIG. 27 is a logic diagram of an embodiment of a method for a merchant registration web page interface to facilitate the processing of a merchant data file in accordance with the present invention.

FIG. 27 is a logic diagram of an embodiment of a method for a merchant registration web page (MRW) interface or function 75 to facilitate the processing of a merchant data file. The method begins at step 420 where the MRW interface 75 receives, from a requesting device, a request to access a record within an entity profile database (e.g., merchant profile database). The requesting device may be merchant device or an acquirer device.

The method continues at step 422 where the MRW interface 75 authenticates the requesting device. For example, the MRW interface 75 may verify the user ID and password to authenticate the requesting device. If the requesting device is not authenticated, the method proceeds to step 424 where the MRW interface 75 denies the request.

If, however, the requesting device is authenticated, the method continues at step 426 where the MRW interface 75 determines the status of the requesting device. For example, a requesting merchant device will have a first status level and a requesting acquirer device will have a second status level. The method continues at step 428 where the MRW interface 75 retrieves the record from the entity profile database to produce a retrieved record. The method continues at step 430 where the MRW interface 75 presents the retrieved record to the requesting device in accordance with the status of the requesting device. FIGS. 6-11 provides various examples of how the MRW interface 75 can provide the retrieved record to the requesting device.

The method continues at step 432 where the MRW interface 75 receives a data change from the requesting device. The method continues at step 434 where the MRW interface 75 records the data change. The data change may be for correction of inaccurate data, for inclusion of missing data, and/or for changing status in a QPCA program. The method proceeds to step 436 where the MRW interface 75 determines whether the change has been verified. In one embodiment, the data change may be verified by receiving approval from an acquirer. If the data change is approved, the method continues at step 438 where the MRW interface 75 provides an updated record to the entity profile database.

If the data change is not verified, the method continues at step 440 where the MRW interface 75 overwrites the data change in the field with the current field content, which was temporarily stored as previously discussed. The method then continues at step 442 where the MRW interface stores a non-approval of the data change in a rejection field of a first dashboard (e.g., a web page as shown in FIGS. 6-11). The method then continues at step 444 where the MRW interface 75 updates the record status to active.

Figure 28:
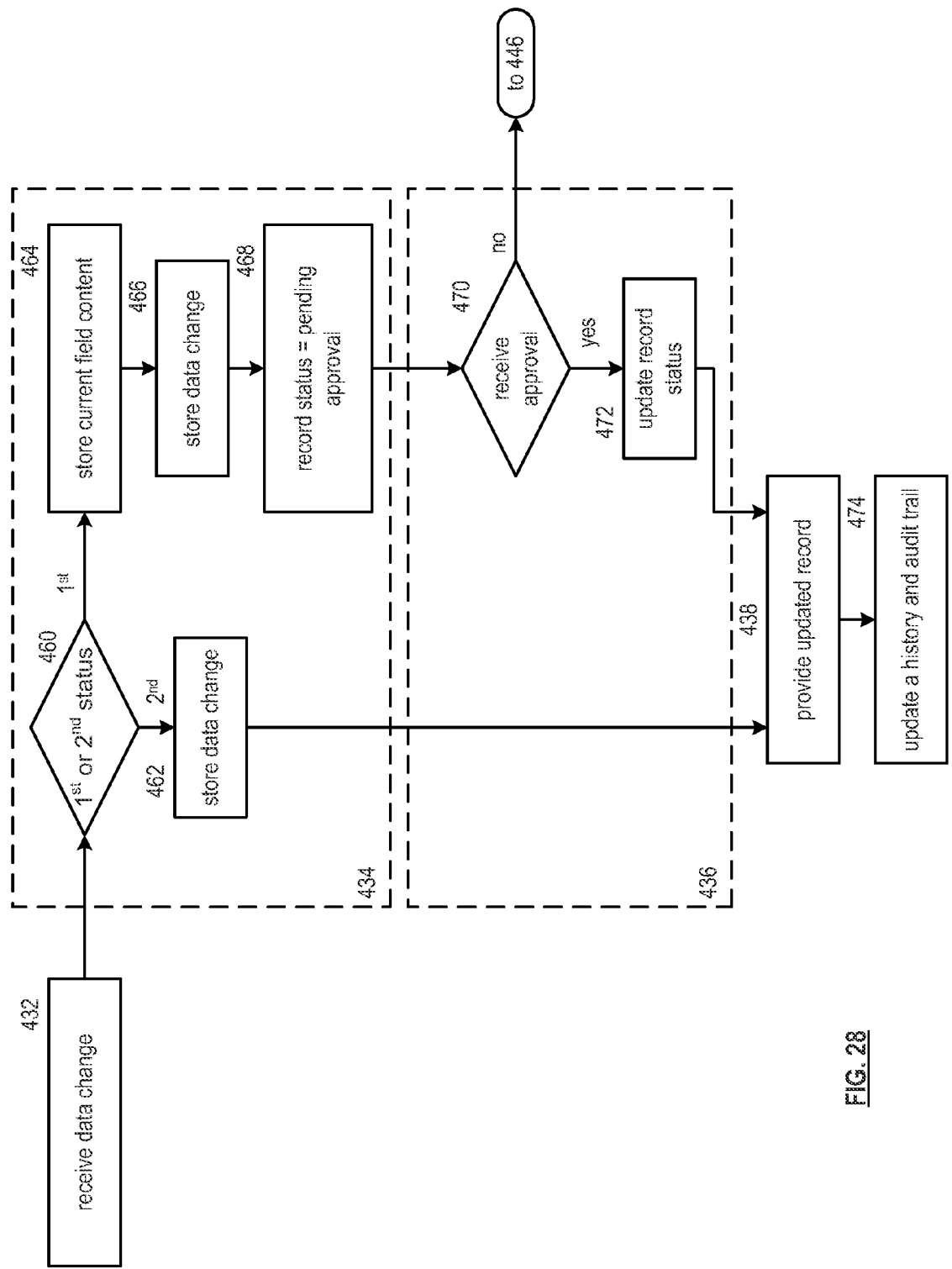
FIG. 28 is a logic diagram of another embodiment of a method for a merchant registration web page interface to facilitate the processing of a merchant data file in accordance with the present invention.

FIG. 28 is a logic diagram of another embodiment of a method for a merchant registration web page (MRW) interface 75 to facilitate further processing of a merchant data file. The method begins with steps 432-438 of FIG. 27, with additional processing steps for each of steps 434 and 436. Within step 434, the MRW interface 75 determines whether the status of the requesting device is a first level (e.g., a merchant level) or a second level (e.g., an acquirer level). When the status of the requesting device is a first status level, the method continues to step 464 where the MRW interface 75 receives the data change for a field of a first dashboard and stores current field content of the field in temporary storage.

The method continues at step 466 where the MRW interface 75 stores the data change in the field. For example, if a merchant device is changing its DBA name, the current data (e.g., Bob's Hamburger Stand) is stored in temporary memory (e.g., register, buffer, merchant repository, etc.) and the data change (e.g., Bob and Daughter's Hamburger Stand) is stored in the DBA name field on the Merchant Information Page. The method continues to step 468 where the MRW interface provides a record status of pending approval for the record on the merchant information page.

If, within step 434, the status of the requesting device is the second level, the method continues to step 462 where the MRW interface stores the data change in the field of the merchant information page. In addition, the record status is updated or remains "active".

Within step 436, if the status of the requesting device is the second level, its data changes are automatically accepted. Thus the process continues at step 438. If the status is the first level, then the method continues at step 470 where the MRW interface 75 determines whether it has received approval of the data change. If not, the method continues at step 446 of FIG. 27. If approval is received, the method continues to step 472 where the MRW interface 75 updates the record status to "active".

The method continues at step 438 where the MRW interface 75 provides the updated record to the merchant profile database. The method then continues at step 474 where the MRW interface 75 updates a history and audit trail for the at least one record. In this step, the MRW interface 75 records various data points regarding the data change. For example, the various data points include, but are not limited to, time of day, date, fields being changed, previous data, individual user information, etc.

Figure 29:
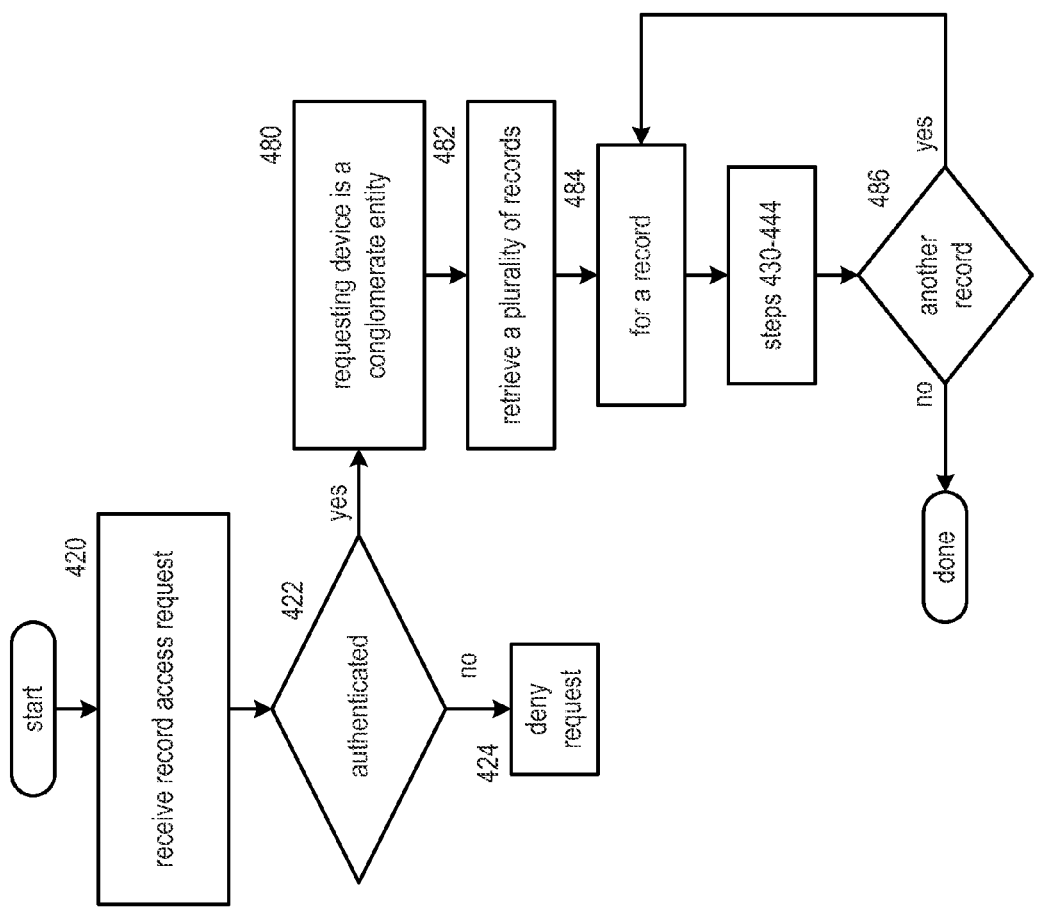
FIG. 29 is a logic diagram of another embodiment of a method for a merchant registration web page interface to facilitate the processing of a plurality of merchant data files in accordance with the present invention.

FIG. 29 is a logic diagram of another embodiment of a method for a merchant registration web page (MRW) interface 75 to facilitate the processing of a plurality of merchant data files. This method begins with steps 420-424 of FIG. 27. If the requesting device is authenticated, the method continues at step 480 where the MRW interface 75 identifies the requesting device as a conglomerate entity that includes a plurality of single entities, where at least some of the single entities have a record in the entity profile database. The method continues at step 482 where the MRW interface 75 retrieves a plurality of records regarding at least some of the single entities. Note that the retrieved records are linked based on a user code of the conglomerate entity. An example of this was provided with reference to FIG. 15.

The method continues at step 484 where a record of the plurality of retrieved records is processed in accordance with steps 430-444 of FIG. 27. After the processing of this record, the method continues to step 486 where the MRW interface 75 determines whether there is another record of the plurality of retrieved records to be processed. If not, the method is done. If there is another record, the method repeats at step 484 for the record.

FIG. 30 is a logic diagram of another embodiment of a method for a merchant registration web page (MRW) interface 75 to facilitate the processing of a merchant data file. The method begins at step 490 where the MRW interface 75 processes log-in of a merchant device to a merchant registration website. An example of this is provided in FIG. 6. The method continues at step 492 where the MRW interface 75 determines whether the log-in was successful. If not, the method proceeds to step 494 where the MRW interface 75 denies access.

If, however, the log-in was successful, the method continues at step 496 where the MRW interface 75 provides access to a merchant profile record from a merchant profile database. Note that the merchant profile record contains information regarding a merchant associated with the merchant device. In an embodiment, the access may be provided by accessing the merchant profile database; retrieving data content of the merchant profile record from the merchant profile database; and providing the data content of the merchant profile record as the accessed merchant profile record in a merchant access dashboard. An example of this is provided in FIG. 7.

The method continues at step 498 where the MRW interface 75 provides record options regarding the accessed merchant profile record to the merchant device. The record options include, but are not limited to, opting in or out of a QPCA program, confirming the data contained in the merchant profile record, updating the data of the merchant profile record, submit changes, etc. The method continues at step 500 where the MRW interface 75 receives a record manipulation request from the merchant device. The manipulation request may be in accordance with a selection of one of the record options.

The method continues at step 502 where the MRW interface 75 verifies the record manipulation request is in accordance with the record options. If not verified at step 504, the method continues at step 506 where the MRW interface 75 rejects the manipulation request. If, however, the request is verified, the method continues at step 508 where the MRW interface 75 provide the manipulation of the accessed merchant profile record to the merchant profile database for updating of the merchant profile record.

FIG. 31 is a schematic block diagram of an embodiment of an acquirer device 28-30 that is coupled to a display 520 and a keyboard and/or the user input device (e.g., mouse, touch screen, voice recognition, etc.). The acquirer device 28-30 includes a processing module 510, memory 512, and an interface. In this illustration, the interface includes a user output interface 5124, a user input interface 516, and a network interface 518 for coupling the acquirer device 28-30 to a network connection (e.g., a local area network, a wide area network, internet, etc.).

The processing module 510 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 510 may have an associated memory 510 and/or memory element, which may be a single memory device, a plurality of memory devices, and/or embedded circuitry of the processing module 510. Such a memory device may be a read-only memory, random access memory, volatile memory, non-volatile memory, static memory, dynamic memory, flash memory, cache memory, and/or any device that stores digital information. Note that when the processing module 510 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 510 executes, hard coded and/or operational instructions corresponding to at least some of the steps and/or functions illustrated in FIGS. 4-35.

Figure 32:
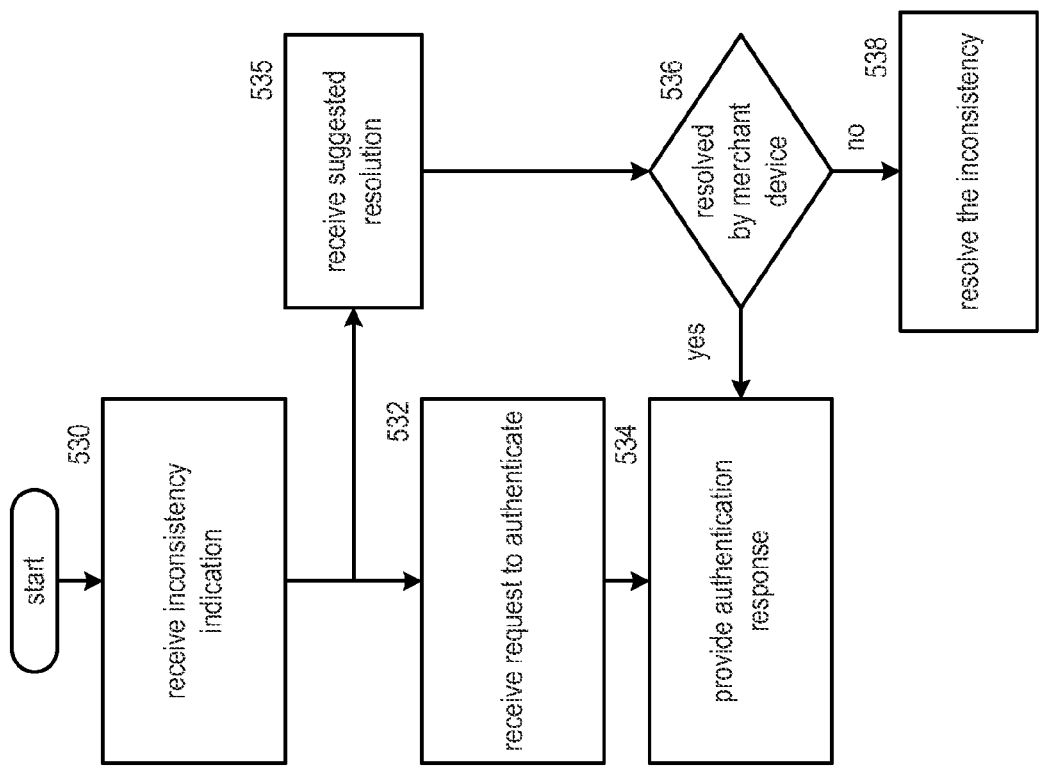
FIG. 32 is a logic diagram of an embodiment of a method for an acquirer device to facilitate the processing of a merchant data file in accordance with the present invention.

FIG. 32 is a logic diagram of an embodiment of a method for an acquirer device 28-30 to facilitate the processing of a merchant data file. The method begins at step 530 where the acquirer device 28-30 receives an indication that one of a plurality of merchant data files includes an inconsistency with respect to a corresponding merchant profile record of the merchant profile database. The inconsistency may be one or more of a status change with respect to Qualified Payment Card Agent (QPCA) program, an inconsistency (e.g., misspelling, incorrect, missing, etc.) with the merchant name, an inconsistency with the merchant business address, an inconsistency with the merchant business information, which includes at least one of taxpayer information, market segment information, socioeconomic information, an inconsistency with small business information (e.g., minority owned, veteran owned, non-profit, etc), a missing corresponding record in the merchant profile database, and/or a missing corresponding merchant data file for a merchant profile record in the merchant profile database.

The method continues at steps 532 and 535. At step 532, the acquirer device 28-30 receives a request to authenticate the updating of the corresponding merchant profile record when the inconsistency is addressed by a merchant device updating the corresponding merchant profile record. The method continues to step 534 where the acquirer device 28-30 provides an authentication response regarding the updating of the corresponding merchant profile record. In addition, the acquirer device 28-30 may update its merchant master file in accordance with the resolution of the inconsistency.

At step 535, the acquirer device 28-30 receives a suggested resolution for the inconsistency from the FTP device 12 and/or the MRW interface 75. The method continues at step 536 where the acquirer device 28-30 determines whether the merchant device resolved the inconsistency in accordance with the suggested correction. If yes, the method continues at step 534. If not, the method continues at step 538 where the acquirer device resolves the inconsistency in accordance with the suggested resolution.

Figure 33:
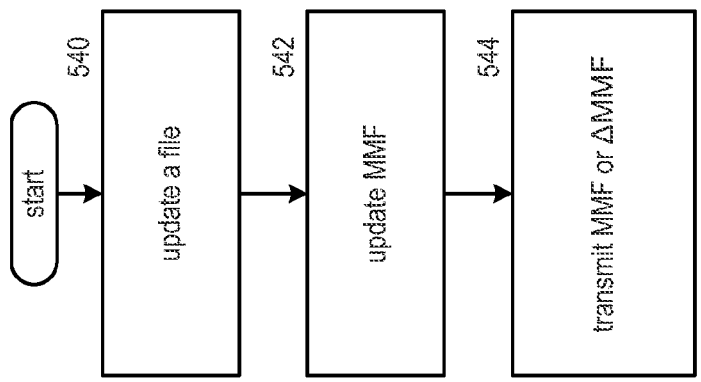
FIG. 33 is a logic diagram of another embodiment of a method for an acquirer device to facilitate the processing of a merchant data file in accordance with the present invention.

FIG. 33 is a logic diagram of another embodiment of a method for an acquirer device 28-30 to further facilitate the processing of a merchant data file. The method begins at step 540 where the acquirer device 28-30 update a merchant data file based on information obtained from a corresponding merchant device. The updating may include requesting that a merchant profile record be created for the merchant and/or creating a merchant data file for the merchant.

The method continues at step 542 where the acquirer device 28-30 updates its merchant master file in accordance with the updated merchant data file. The method continues at step 544 where the acquirer device 28-30 transmits at least a portion of the updated merchant master file to a financial transactions processing.

Figure 34:
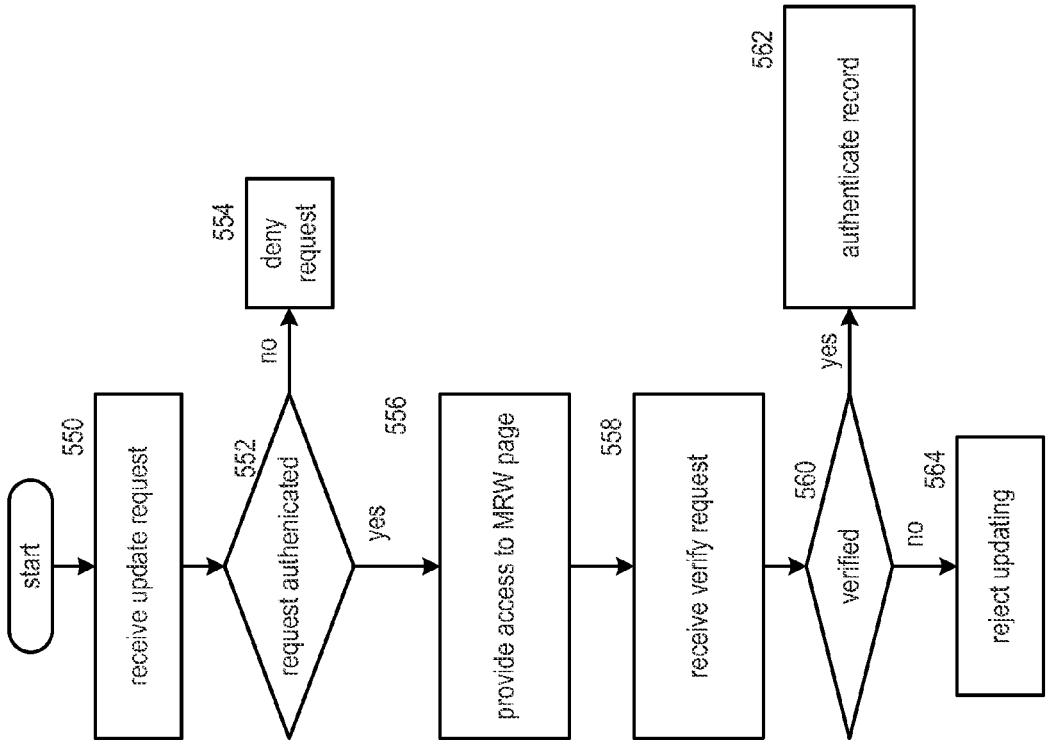
FIG. 34 is a logic diagram of another embodiment of a method for an acquirer device to facilitate the processing of a merchant data file in accordance with the present invention.

FIG. 34 is a logic diagram of another embodiment of a method for an acquirer device 28-30 to facilitate the processing of a merchant data file. The method begins at step 550 where the acquirer device 28-30 receives a request to update a merchant profile record from a merchant device. The method continues at step 552 where the acquirer device 28-30 determines whether request is authentic. The authenticating may include comparing a merchant code contained within the request with a merchant code received from a financial transactions processing device; and when the merchant code contained within the request compares favorably with the merchant code received from a financial transactions processing device, indicating authentication of the request.

If the request is not authenticated, the request is denied at step 554. If, however, the request is authenticated, the method continues at step 556 where the acquirer device provides the merchant device with access to a merchant web site associated with the financial transactions processing device. An example of this is provided in FIG. 26. The method continues at step 558 where the acquirer device 28-30 receives a request to verify an updated version of the merchant profile record. If the not verified, the updated record is rejected at step 564.

If the updating is verified (e.g., approved), the method branches from step 560 to step 562. At step 562, the acquirer device authenticates the updated version of the merchant profile record. In an embodiment, the updated version may be authenticated by receiving a suggested updated version of the merchant profile record; comparing the suggested updated version with the updated version of the merchant profile record; and, when the comparison of the suggested updated version with the updated version of the merchant profile record is favorable, indicating that the updated version of the merchant profile record has been verified.

Figure 35:
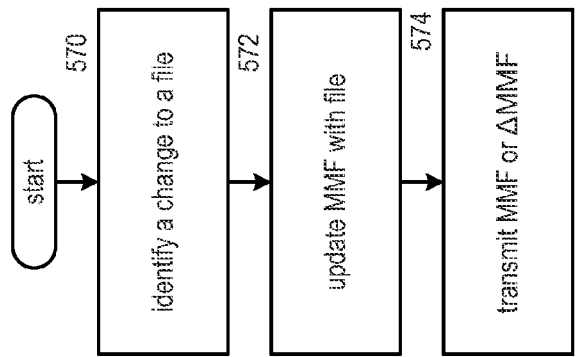
FIG. 35 is a logic diagram of another embodiment of a method for an acquirer device to facilitate the processing of a merchant data file in accordance with the present invention.

FIG. 35 is a logic diagram of another embodiment of a method for an acquirer device 28-30 to facilitate the processing of a merchant data file. The method begins at step 570 where the acquirer device 28-30 identifies a change to merchant data associated with the merchant device. For example, from processing a credit card transaction, the acquirer may detect a change in the merchant's information. Alternatively, the merchant may provide the acquirer with new information.

The method continues at step 572 where the acquirer device 28-30 updates a corresponding merchant data file within its merchant master file based on the identified change. The method continues at step 574 where the acquirer device 28-30 transmits at least a portion of the merchant master file to a financial transactions processing module associated with the merchant profile database such that the merchant profile record can be updated in accordance with the corresponding merchant data file.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
   receiving, by a processor, at least a portion of a merchant master file, wherein the merchant master file includes a plurality of merchant data files;
   for a merchant data file of the plurality of merchant data files:
      determining, by the processor, whether a corresponding merchant profile record exists within a merchant profile database;
      when the corresponding merchant profile record exists in the merchant profile database, comparing, by the processor, the merchant data file with the corresponding merchant profile record;
      when an inconsistency exists between the corresponding merchant profile record and the merchant data file, determining, by the processor, a status of the merchant data file with respect to the at least a portion of the merchant master file;
      when the status of the merchant data file is a first status level, generating, by the processor, an inconsistency message that identifies the inconsistency, wherein the status of the merchant data file is the first status level if the merchant master file received is an initial file; and
      when the status of the merchant data file is a second status level, updating, by the processor, the merchant profile record in accordance with the merchant data file, wherein the status of the merchant data file is the second status level if the merchant master file received is a delta file that includes updated information.

2. The method of claim 1 further comprises:
   when no inconsistency exists between the merchant profile record and the merchant data file, determining whether each of the merchant data files of the at least a portion of the merchant master file have been processed;

when each of the merchant data files of the at least a portion of the merchant master file has not been processed, processing another merchant data file, wherein the processing includes:
  determining whether a second corresponding merchant profile record exists within the merchant profile database for the another merchant data file;
  when the second corresponding merchant profile record exists in the merchant profile database, comparing the another merchant data file with the second corresponding merchant profile record;
  when a second inconsistency exists between the second corresponding merchant profile record and the another merchant data file, determining status of the another merchant data file with respect to the at least a portion of the merchant master file; and
  when the status of the another merchant data file is a first status level, generating a second inconsistency message that identifies the second inconsistency.

3. The method of claim 1 further comprises:
when the corresponding merchant profile record does not exist in the merchant profile database, creating the corresponding merchant profile record based on the merchant data file.

4. The method of claim 1, wherein generating the inconsistency message further comprises:
generating a suggested correction for the inconsistency.

5. The method of claim 1 further comprises:
detecting correction of the inconsistency by a merchant device;
recording the correction within the merchant profile record pending approval from an acquirer device;
providing notice of the correction to the acquirer device;
receiving approval of the correction from the acquirer device; and
updating the merchant profile record in accordance with the approval.

6. The method of claim 1 further comprises:
supplementing the merchant profile record with third party data regarding a merchant identified in the merchant profile record.

7. The method of claim 1 further comprises at least one of:
supplementing the merchant profile record with tax payer identification number of a merchant identified in the merchant profile record; and
supplementing the merchant profile record with Coding Accuracy Support System (CASS) information of the merchant identified in the merchant profile record.

8. The method of claim 1 further comprises:
receiving a plurality of acquirer-merchant files from a plurality of acquirer devices, wherein the plurality of acquirer-merchant files includes at least one of: a plurality of merchant master files and a plurality of delta merchant master files and wherein the plurality of acquirer-merchant files includes the at least a portion of the merchant master file;
determining whether multiple acquirer-merchant files of the plurality of acquirer-merchant files include a version of the merchant data file;
when the multiple acquirer-merchant files include a version of the merchant data file, for each of the multiple acquirer-merchant files that include a version of the merchant data file:
  comparing the version of the merchant data file with the corresponding merchant profile record;
  when an inconsistency exists between the corresponding merchant profile record and the version of the merchant data file, determining status of a corresponding one of multiple acquirer-merchant files;
  when the status of the corresponding one of multiple acquirer-merchant files is the first status level, generating the inconsistency message that identifies the inconsistency between the corresponding merchant profile record and the version of the merchant data file; and
  transmitting the inconsistency message to an acquirer device associated with the corresponding one of the multiple acquirer-merchant files.

9. The method of claim 1, wherein prior to receiving at least the portion of the merchant master file, sending a request for the at least the portion of the merchant master file.

10. The method of claim 1, wherein the inconsistency message requests an acquirer or a merchant to verify data in the merchant data file.

11. The method of claim 1, wherein the merchant master file is received from an acquirer device.

12. A method comprises:
receiving, by a processor, at least a portion of a merchant master file, wherein the merchant master file includes a plurality of merchant data files;
processing a merchant data file of the plurality of merchant data files by:
  accessing, by the processor, a merchant profile database for a corresponding merchant profile record; and
  when the corresponding merchant profile record exists, determining, by the processor, whether an inconsistency exists between the merchant data file and the corresponding merchant profile record;
generating, by the processor, a first report that identifies one or more merchant data files of the plurality of merchant data files that have the inconsistency with corresponding merchant profile records;
generating, by the processor, a second report that includes one or more merchant data files of the plurality of merchant data files that do not have the inconsistency with corresponding merchant profile records; and
sending, by the processor, one or more update requests to one or more merchants associated with the one or more merchant data files identified in the first report.

13. The method of claim 12, wherein the inconsistency comprises at least one of:
the corresponding merchant profile record does not exist; and
at least one field of the corresponding merchant profile record does not match a corresponding field of the merchant data file.

14. The method of claim 12 further comprises:
identifying a merchant profile record of the merchant profile database based on identity of a provider of the at least a portion of the merchant master file that does not have a corresponding merchant data file in the plurality of merchant data files; and
generating another report indicating that the merchant profile record does not have the corresponding merchant data file in the plurality of merchant data files.

15. The method of claim 12 further comprises:
receiving a plurality of at least a portion of merchant master files that include the at least a portion of the merchant master file; and
generating a merchant master repository based on the plurality of at least a portion of the merchant master files and the merchant profile database.

16. The method of claim 12, wherein the first report and the second report include different merchant data files of the plurality of merchant data files from each other.

17. The method of claim 12, wherein the update request includes a suggested correction and informs the merchant of the inconsistency.

18. An apparatus comprises:
an interface;
memory; and
a processing module coupled to the interface and the memory, wherein the processing module is coupled to:
receive, via the interface, at least a portion of a merchant master file, wherein the merchant master file includes a plurality of merchant data files;
for a merchant data file of the plurality of merchant data files:
determine whether a corresponding merchant profile record exists within a merchant profile database;
when the corresponding merchant profile record exists in the merchant profile database, compare the merchant data file with the corresponding merchant profile record;
when an inconsistency exists between the corresponding merchant profile record and the merchant data file, determine a status of the merchant data file with respect to the at least a portion of the merchant master file;
when the status of the merchant data file is a first status level, generate an inconsistency message that identifies the inconsistency, wherein the status of the merchant data file is the first status level if the merchant master file received is an initial file; and
when the status of the merchant data file is a second status level, update the merchant profile record in accordance with the merchant data file, wherein the status of the merchant data file is the second status level if the merchant master file received is a delta file that includes updated information.

19. The apparatus of claim 18, wherein the processing module further functions to:
when no inconsistency exists between the merchant profile record and the merchant data file, determine whether each of the merchant data files of the at least a portion of the merchant master file have been processed;
when each of the merchant data files of the at least a portion of the merchant master file has not been processed, process another merchant data file, wherein the processing includes:
determining whether a second corresponding merchant profile record exists within the merchant profile database for the another merchant data file;
when the second corresponding merchant profile record exists in the merchant profile database, comparing the another merchant data file with the second corresponding merchant profile record;
when a second inconsistency exists between the second corresponding merchant profile record and the another merchant data file, determining status of the another merchant data file with respect to the at least a portion of the merchant master file; and
when the status of the another merchant data file is a first status level, generating a second inconsistency message that identifies the second inconsistency.

20. The apparatus of claim 18, wherein the processing module further functions to:
when the corresponding merchant profile record does not exist in the merchant profile database, create the corresponding merchant profile record based on the merchant data file.

21. The apparatus of claim 18, wherein the processing module further functions to perform at least one of:
supplementing the merchant profile record with third party data regarding a merchant identified in the merchant profile record;
supplementing the merchant profile record with tax payer identification number of a merchant identified in the merchant profile record; and
supplementing the merchant profile record with Coding Accuracy Support System (CASS) information of the merchant identified in the merchant profile record.

22. The apparatus of claim 18, wherein the processing module further functions to:
receive a plurality of acquirer-merchant files from a plurality of acquirer devices, wherein the plurality of acquirer-merchant files includes at least one of: a plurality of merchant master files and a plurality of delta merchant master files and wherein the plurality of acquirer-merchant files includes the at least a portion of the merchant master file;
determine whether multiple acquirer-merchant files of the plurality of acquirer-merchant files include a version of the merchant data file;
when the multiple acquirer-merchant files include a version of the merchant data file, for each of the multiple acquirer-merchant files that include a version of the merchant data file:
compare the version of the merchant data file with the corresponding merchant profile record;
when an inconsistency exists between the corresponding merchant profile record and the version of the merchant data file, determine status of a corresponding one of multiple acquirer-merchant files;
when the status of the corresponding one of multiple acquirer-merchant files is the first status level, generate the inconsistency message that identifies the inconsistency between the corresponding merchant profile record and the version of the merchant data file; and
transmit the inconsistency message to an acquirer device associated with the corresponding one of the multiple acquirer-merchant files.

23. The apparatus of claim 18, wherein the processing module further functions to:
identify a merchant profile record of the merchant profile database based on identity of a provider of the at least a portion of the merchant master file that does not have a corresponding merchant data file in the plurality of merchant data files; and
generate another report indicating that the merchant profile record does not have the corresponding merchant data file in the plurality of merchant data files.

24. The apparatus of claim 18, wherein the processing module further functions to:
receive a plurality of at least a portion of merchant master files that include the at least a portion of the merchant master file; and
generate a merchant master repository based on the plurality of at least a portion of the merchant master files and the merchant profile database.

25. The apparatus of claim 18, wherein the processing module further functions to:
receive a correction of the inconsistency by a merchant device; and
record the correction in the corresponding merchant profile record.

26. The apparatus of claim 18, wherein the processing module further functions to:

provide notice of the correction to the acquirer device;

in response to determining that a response to the notice has not been received within a threshold time period, reject the correction of the inconsistency; and in response to determining that the response to the notice has been received within the threshold time period and includes an approval to the correction from the acquirer device, update the merchant profile record in accordance with the approval.

27. An apparatus comprises:

an interface;

memory; and a processing module coupled to the interface and the memory, wherein the processing module is coupled to:

receive, via the interface, at least a portion of a merchant master file, wherein the merchant master file includes a plurality of merchant data files;

process a merchant data file of the plurality of merchant data files by:

accessing a merchant profile database for a corresponding merchant profile record; and when the corresponding merchant profile record exists, determining whether an inconsistency exists between the merchant data file and the corresponding merchant profile record;

generate a first report that identifies one or more merchant data files of the plurality of merchant data files that have the inconsistency with corresponding merchant profile records;

generate a second report that includes one or more merchant data files of the plurality of merchant data files that do not have the inconsistency with corresponding merchant profile records; and send one or more update requests to one or more merchants associated with the one or more merchant data files identified in the first report.

\* \* \* \* \*